(12) United States Patent
Mitsubayashi et al.

(10) Patent No.: US 11,557,024 B2
(45) Date of Patent: Jan. 17, 2023

(54) PROCESSING APPARATUS, IMAGE SENSOR, AND SYSTEM

(71) Applicant: Sony Semiconductor Solutions Corporation, Kanagawa (JP)

(72) Inventors: Hideki Mitsubayashi, Kanagawa (JP); Takashi Yokokawa, Kanagawa (JP); Naoki Yoshimochi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 251 days.

(21) Appl. No.: 17/023,982

(22) Filed: Sep. 17, 2020

(65) Prior Publication Data

US 2021/0174481 A1 Jun. 10, 2021

Related U.S. Application Data

(63) Continuation of application No. 16/094,135, filed as application No. PCT/JP2017/015666 on Apr. 19, 2017, now Pat. No. 10,825,156.

(30) Foreign Application Priority Data

May 26, 2016 (JP) .............................. JP2016-105353

(51) Int. Cl.
*H04N 5/341* (2011.01)
*G06T 1/00* (2006.01)
(Continued)

(52) U.S. Cl.
CPC ............ *G06T 5/50* (2013.01); *G06F 13/4282* (2013.01); *G06T 1/20* (2013.01); *H04N 5/3415* (2013.01);
(Continued)

(58) Field of Classification Search
CPC ......................... G06T 5/50; G06T 1/20; G06T 2207/20221; G06T 1/0007; H04N 5/3415;
(Continued)

(56) References Cited

U.S. PATENT DOCUMENTS 4,949,391 A * 8/1990 Faulkerson ............ H04N 1/107
382/221
2006/0256122 A1* 11/2006 Rai .................... H04N 5/23293
345/547
(Continued)

FOREIGN PATENT DOCUMENTS

CN 101715644 A 5/2010
CN 101720007 A 6/2010
(Continued)

OTHER PUBLICATIONS

English translation of CN101777036A (Year: 2010).*
(Continued)

*Primary Examiner* — Jon Chang
(74) *Attorney, Agent, or Firm* — Michael Best & Friedrich LLP

(57) ABSTRACT

Provided is a processing apparatus including a processing unit that is connected to a data bus, and performs control involved with an image which is output by each of a plurality of image sensors connected to the data bus, through the data bus.

17 Claims, 25 Drawing Sheets

(51) Int. Cl.
*G06T 5/50* (2006.01)
*G06F 13/42* (2006.01)
*G06T 1/20* (2006.01)

(52) U.S. Cl.
CPC .............. *G06T 1/0007* (2013.01); *G06T 2207/20221* (2013.01)

(58) Field of Classification Search
CPC ............. H04N 5/9201; H04N 5/232; H04N 2201/32; G06F 13/4282; G08B 13/19654
See application file for complete search history.

(56) References Cited

U.S. PATENT DOCUMENTS

| | | |
|---|---|---|
| 2009/0012530 A1 | 1/2009 | Fowler |
| 2011/0242342 A1 | 10/2011 | Goma et al. |
| 2012/0162511 A1 | 6/2012 | Hewes |
| 2013/0215307 A1* | 8/2013 | Park .................. H04N 5/378 327/68 |
| 2014/0111360 A1 | 4/2014 | Gu et al. |
| 2014/0232892 A1 | 8/2014 | Campbell |
| 2014/0267329 A1* | 9/2014 | Lee .................. G09G 5/395 345/522 |
| 2014/0281753 A1 | 9/2014 | Wagh et al. |
| 2015/0061063 A1* | 3/2015 | Kim .................. H01L 27/14605 257/443 |
| 2015/0120975 A1 | 4/2015 | Sengoku |
| 2015/0145952 A1 | 5/2015 | Hirata et al. |
| 2015/0189108 A1 | 7/2015 | Mizuguchi |
| 2016/0044238 A1 | 2/2016 | Takada |
| 2016/0269626 A1 | 9/2016 | McMahon |
| 2018/0159624 A1* | 6/2018 | Jang .................. H04N 5/3532 |

FOREIGN PATENT DOCUMENTS

| | | | |
|---|---|---|---|
| CN | 101777036 A | * | 7/2010 |
| CN | 102884783 A | | 1/2013 |
| CN | 104365081 A | | 2/2015 |
| JP | 09-251527 | | 9/1997 |
| JP | 2013-530558 A | | 7/2013 |
| JP | 2016-040905 A | | 3/2016 |
| WO | 2013/186803 A1 | | 12/2013 |

OTHER PUBLICATIONS

Korean Office Action dated Jul. 21, 2021 for corresponding Korean Application No. 10-2018-7031789.
"Draft MIPI Alliance Specification for Camera Serial Interface 2 (CSI-2)", Draft MIPI Alliance Specification for Camera Serial Interface 2 (CSI-2), (Apr. 2, 2009), XP055165978.
U.S. Corrected Notice of Allowability dated Jul. 24, 2020 for co-pending U.S. Appl. No. 16/094,135.
Japanese Office Action dated Aug. 6, 2019 for corresponding Japanese Application No. 2016-105353.

* cited by examiner

[FIG. 1]
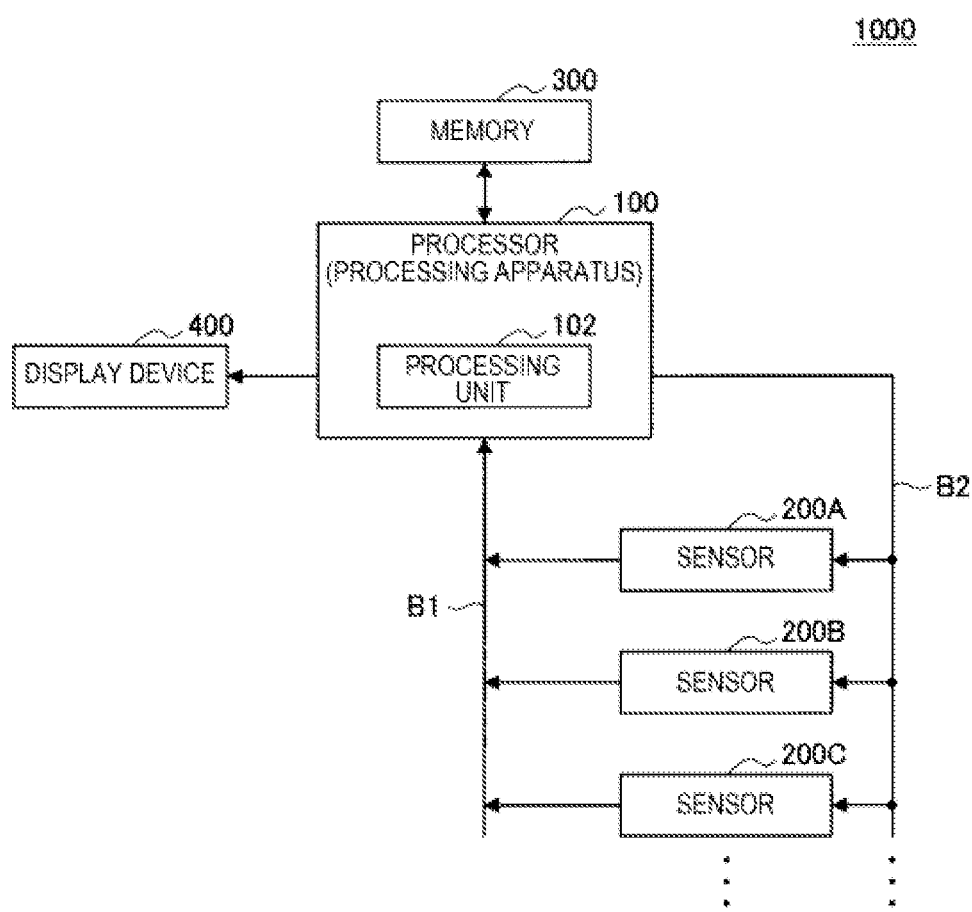

[FIG. 2A]
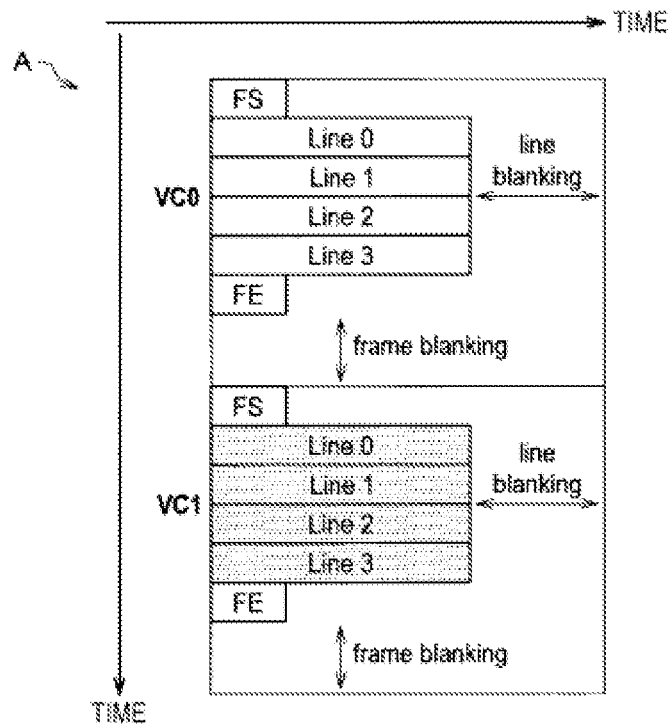
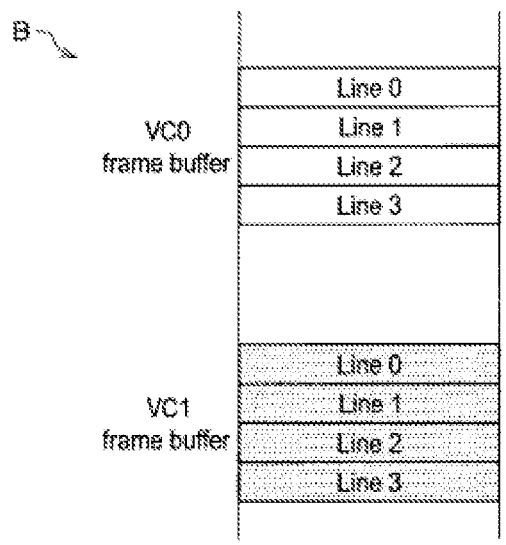

[FIG. 2B]
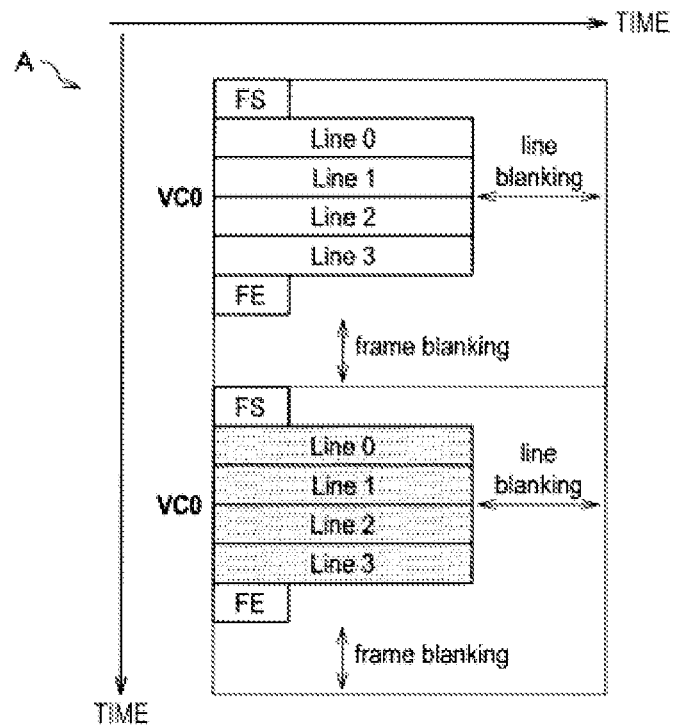
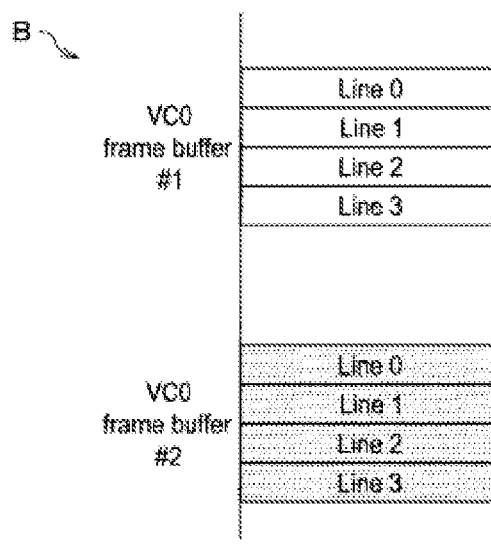

[FIG. 2C]
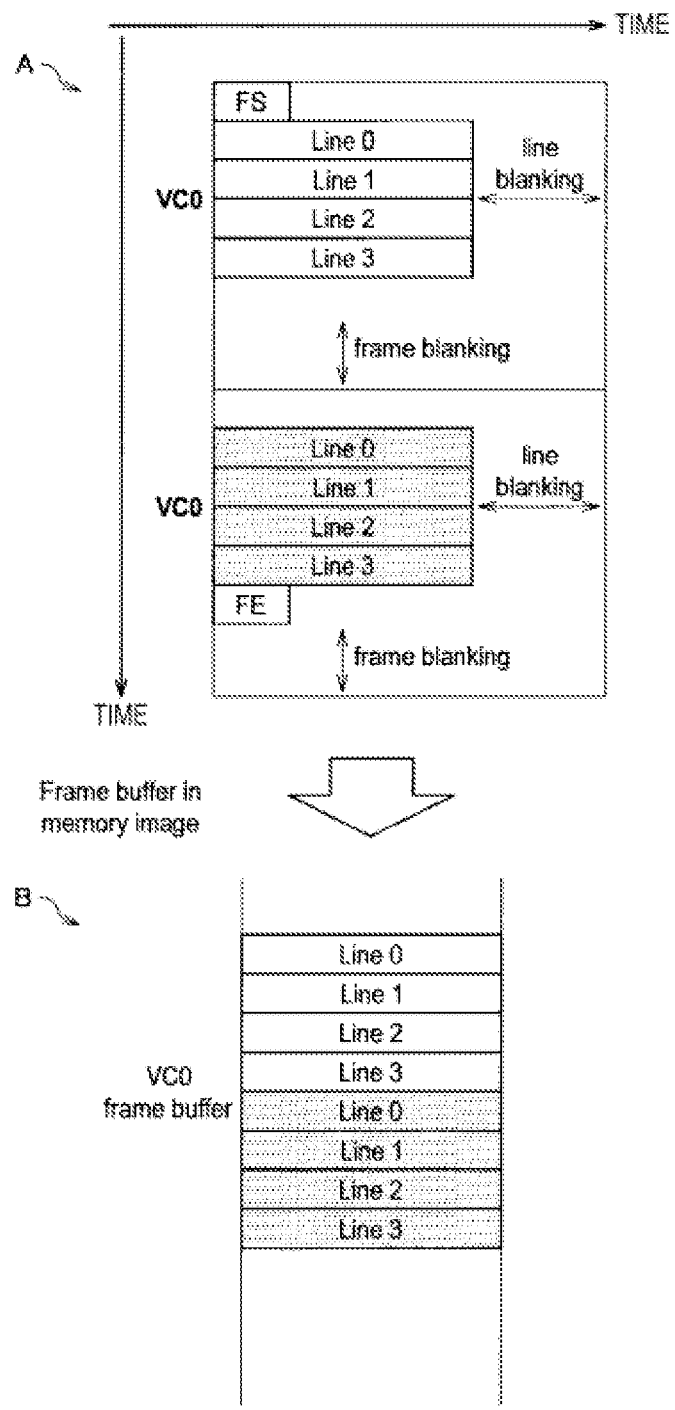

[FIG. 2D]
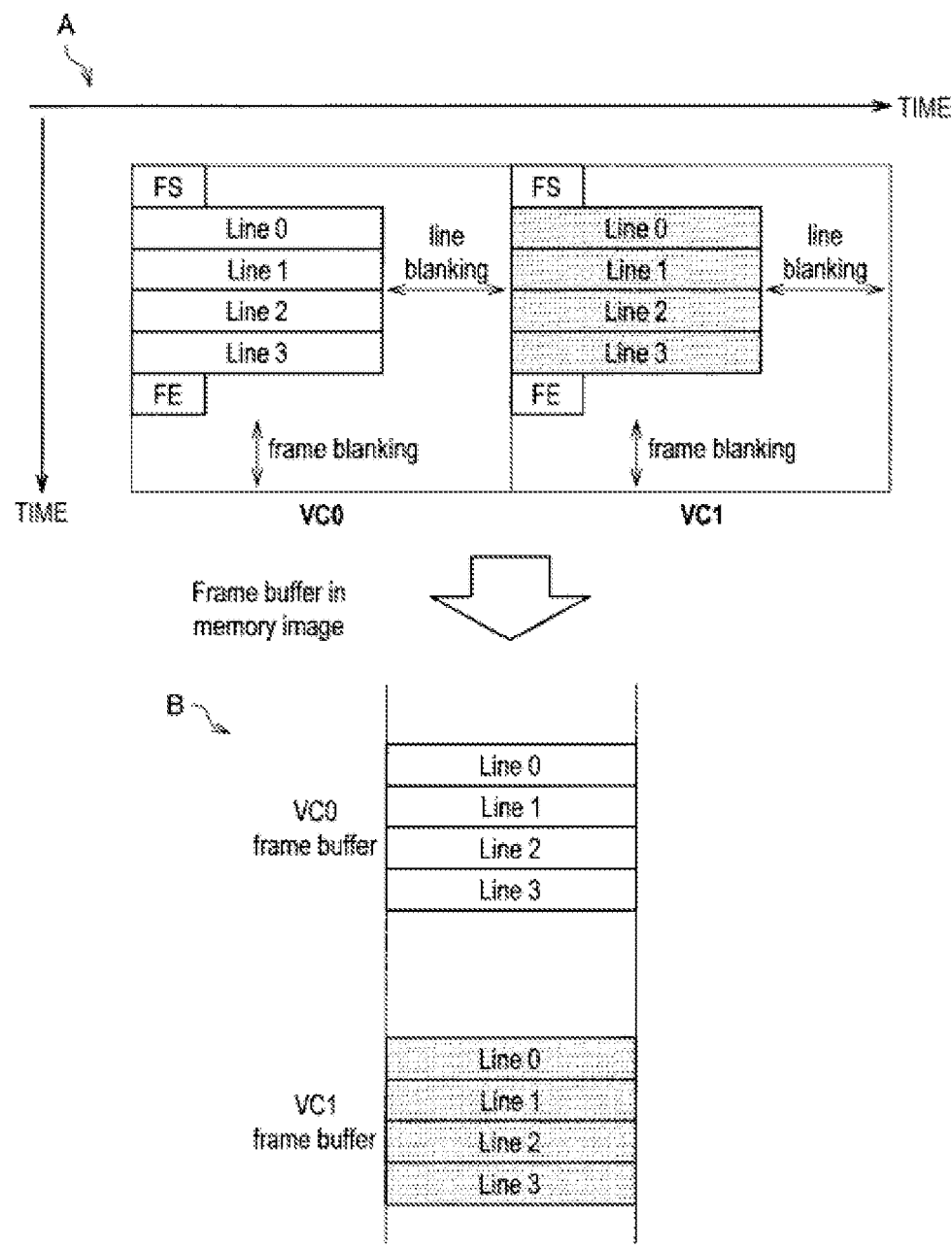

[FIG. 2E]
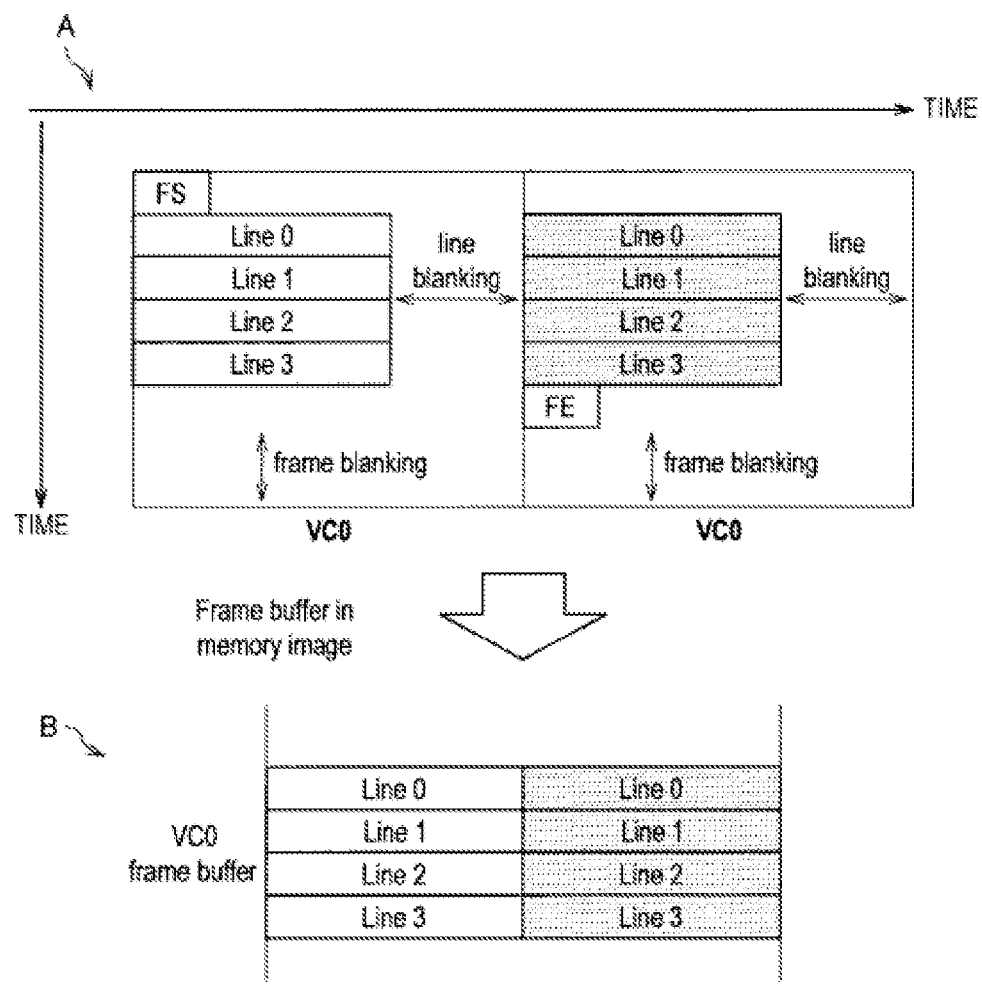

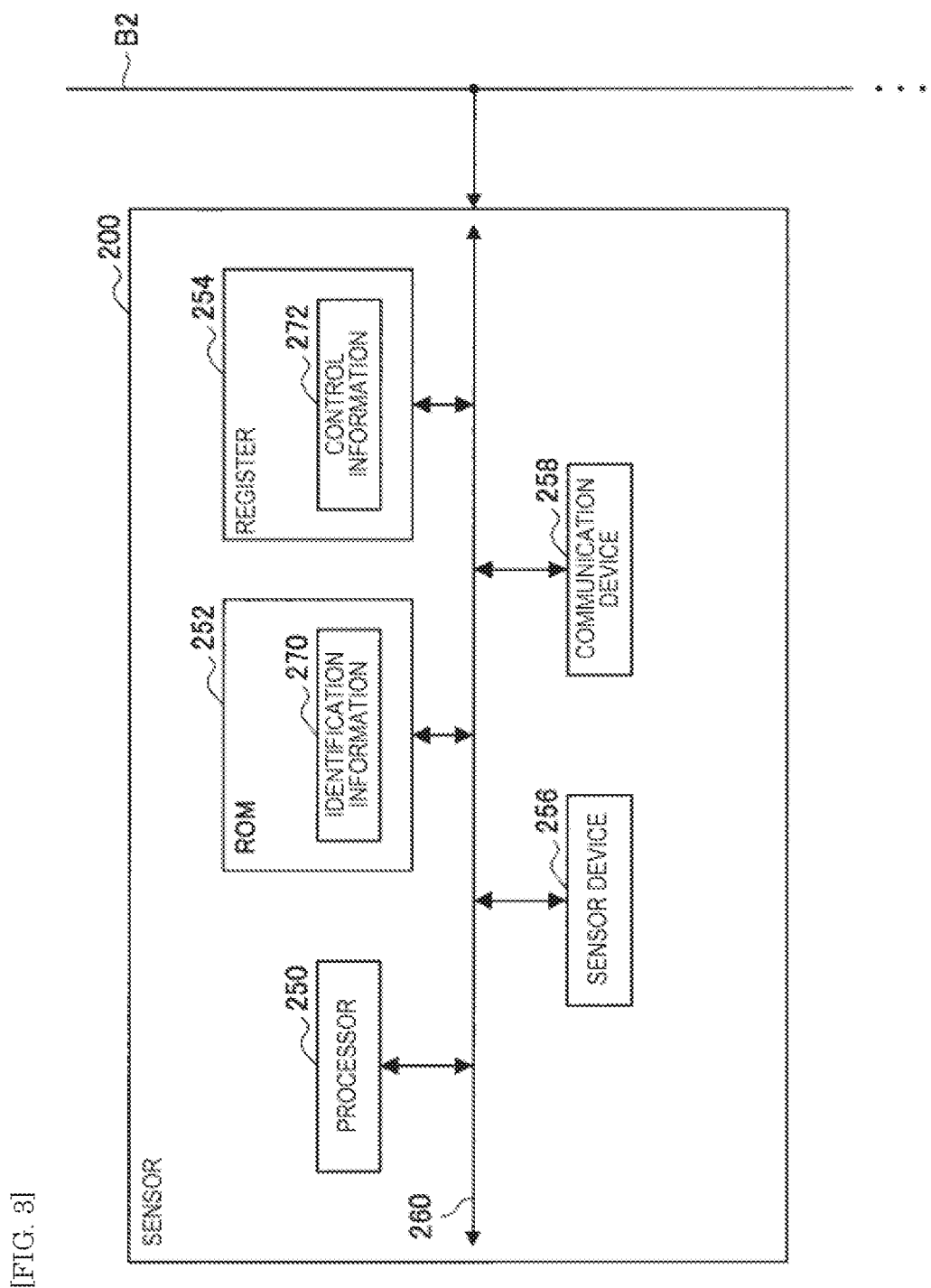
[FIG. 3]

[FIG. 4]

| Line 1 |
|---|
| Line 2 |
| ⋮ |
| Line N-1 |
| Line N |

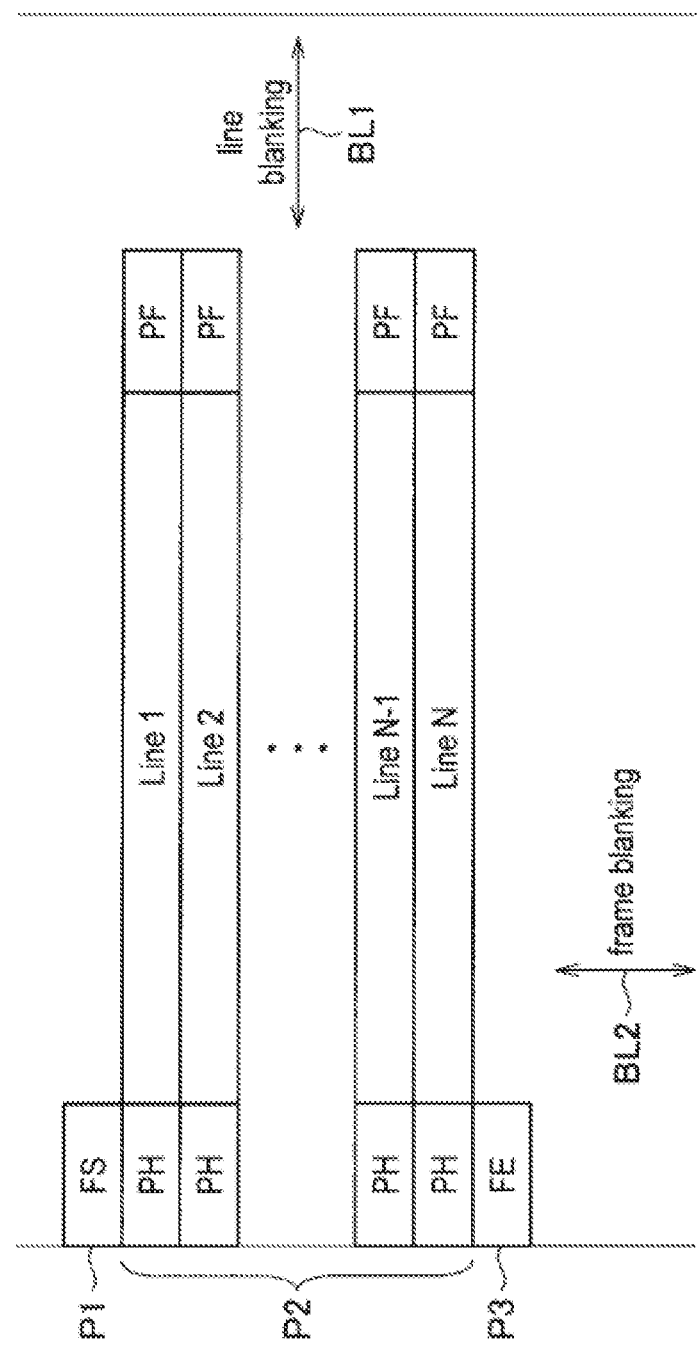

[FIG. 6]
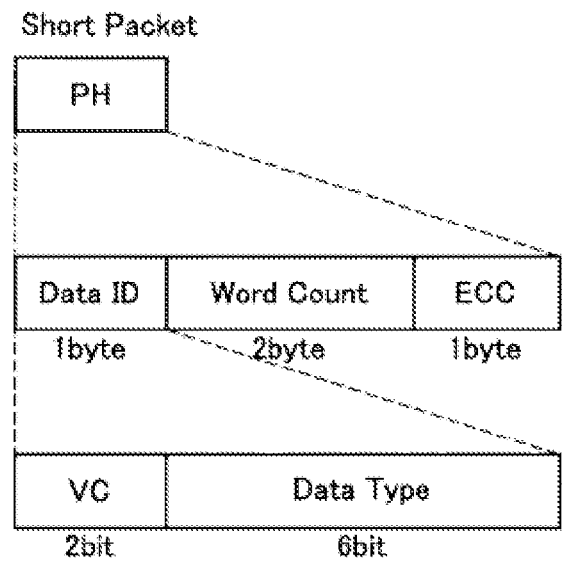
[FIG. 7]
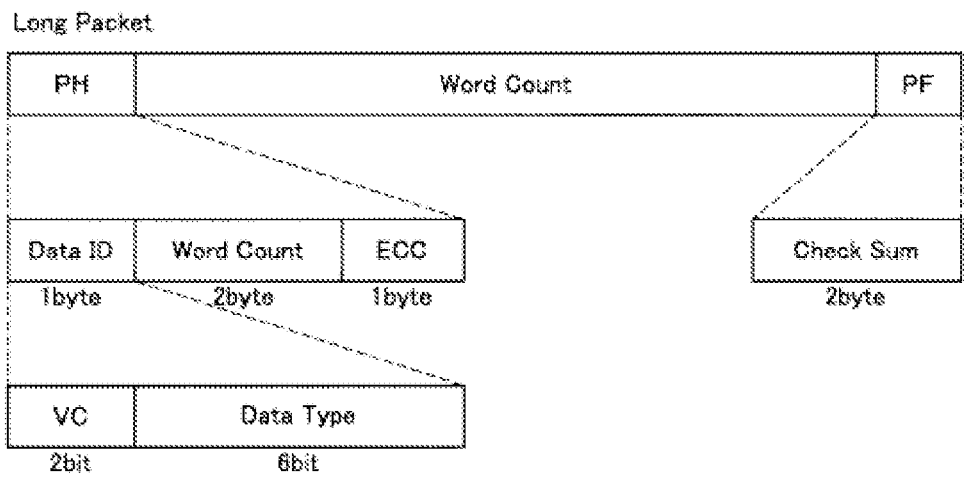

[FIG. 8]
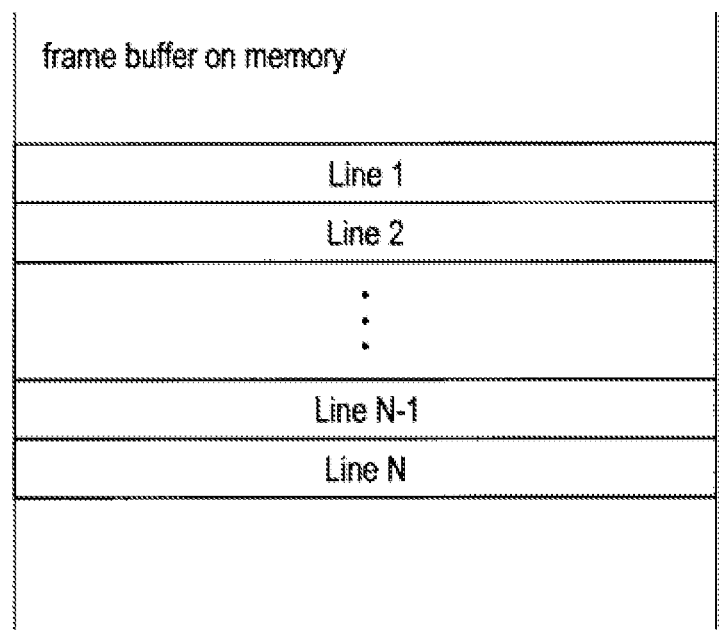

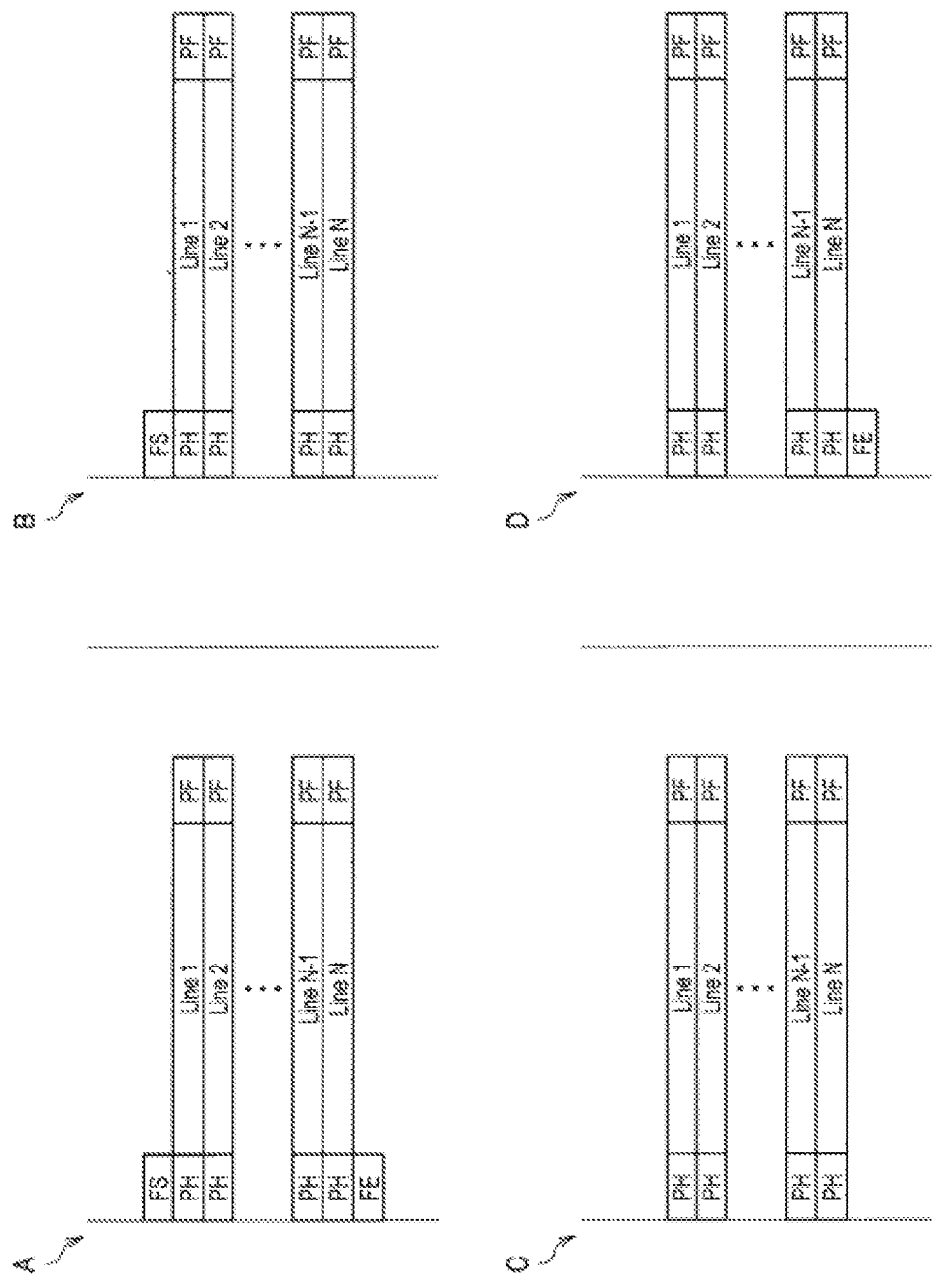
[FIG. 9]

[FIG. 10]
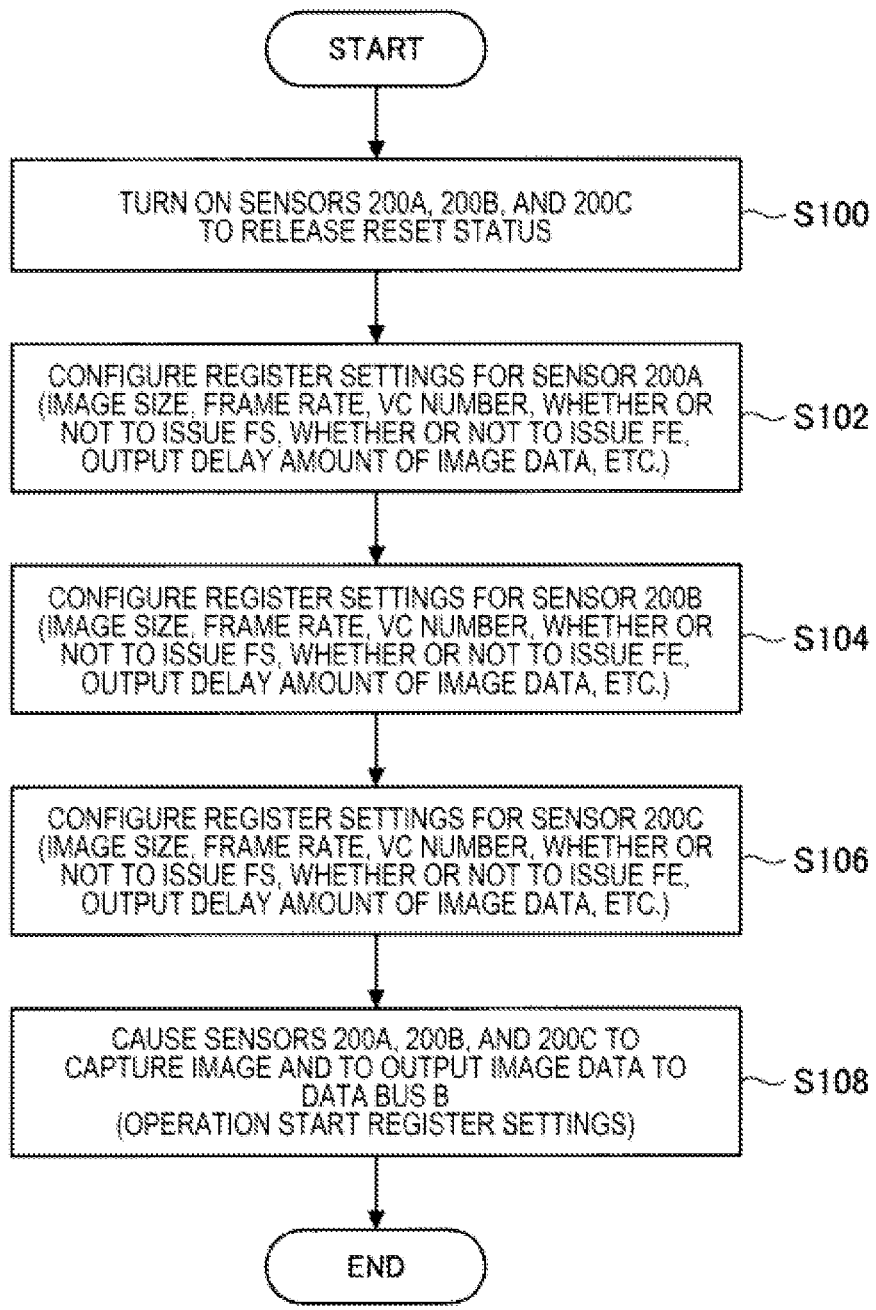

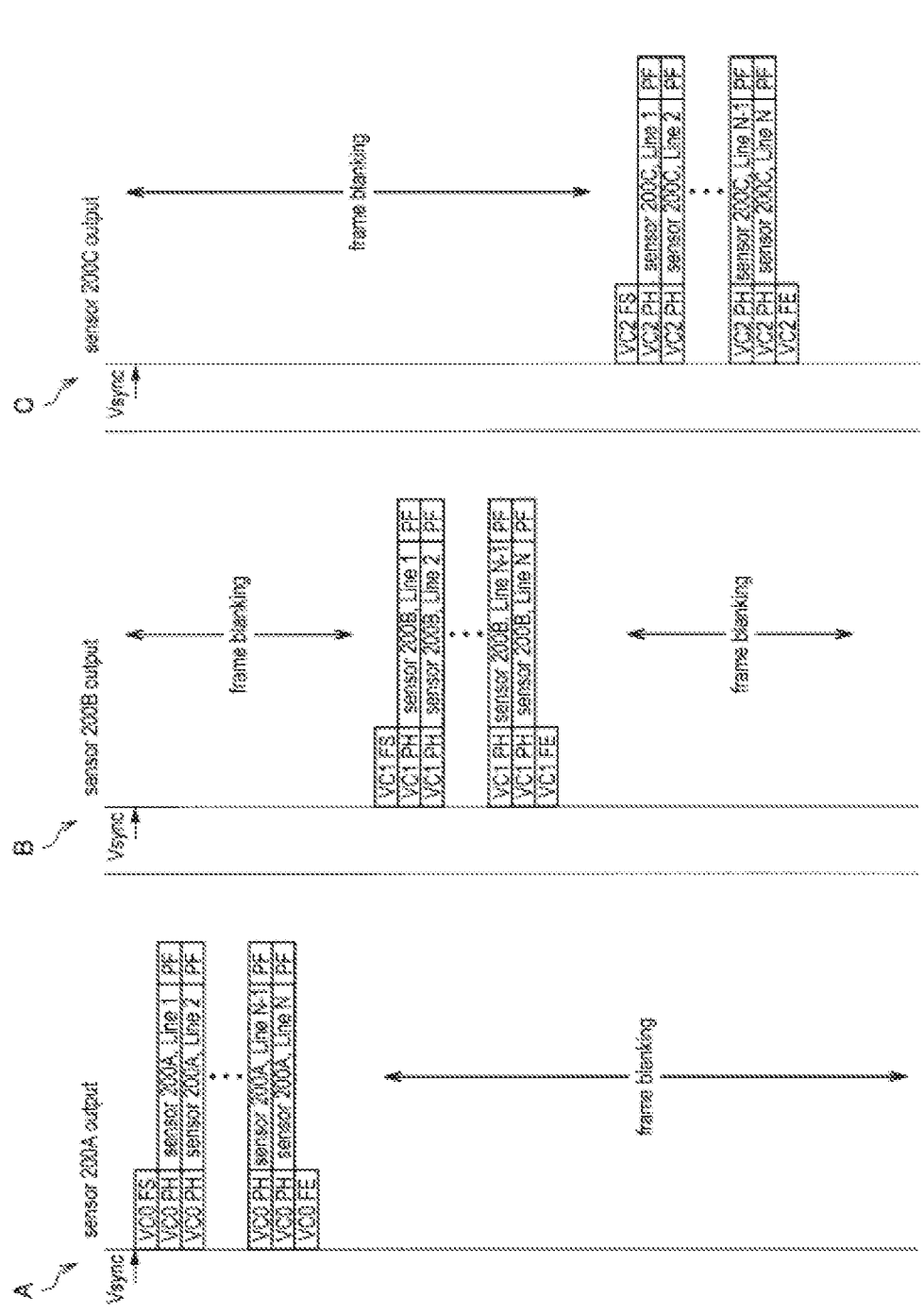
[FIG. 11]

[FIG. 12]
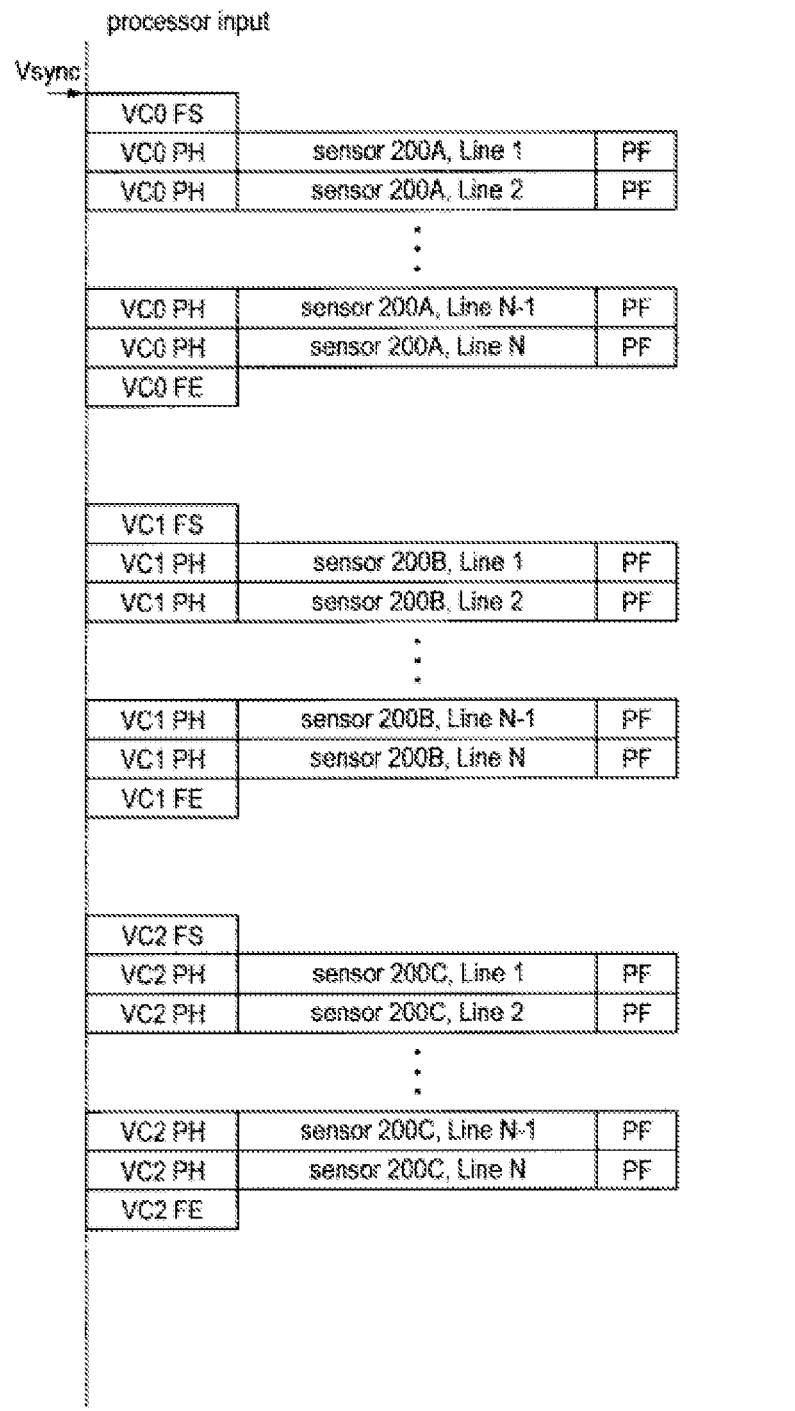

[FIG. 13]
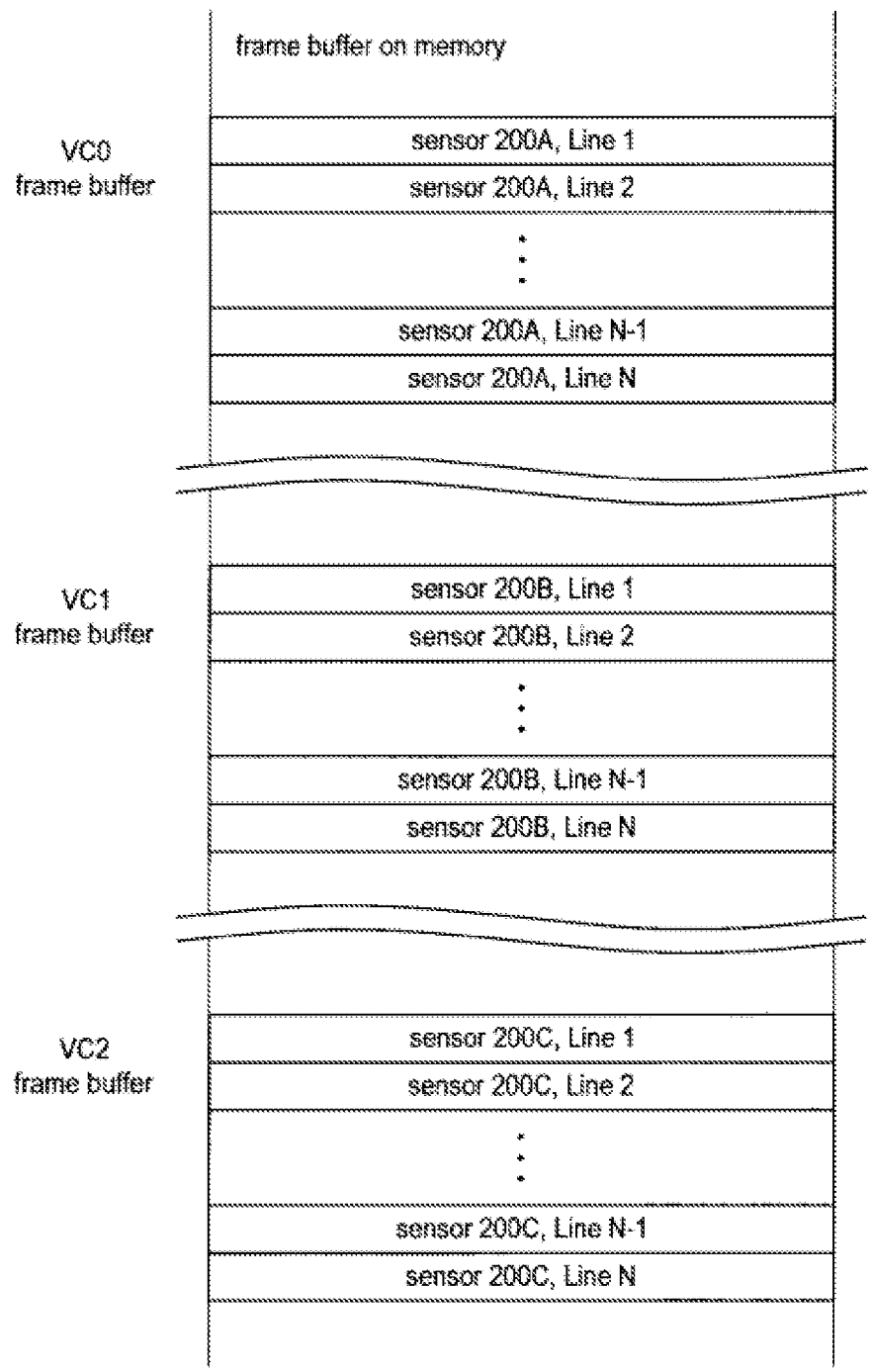

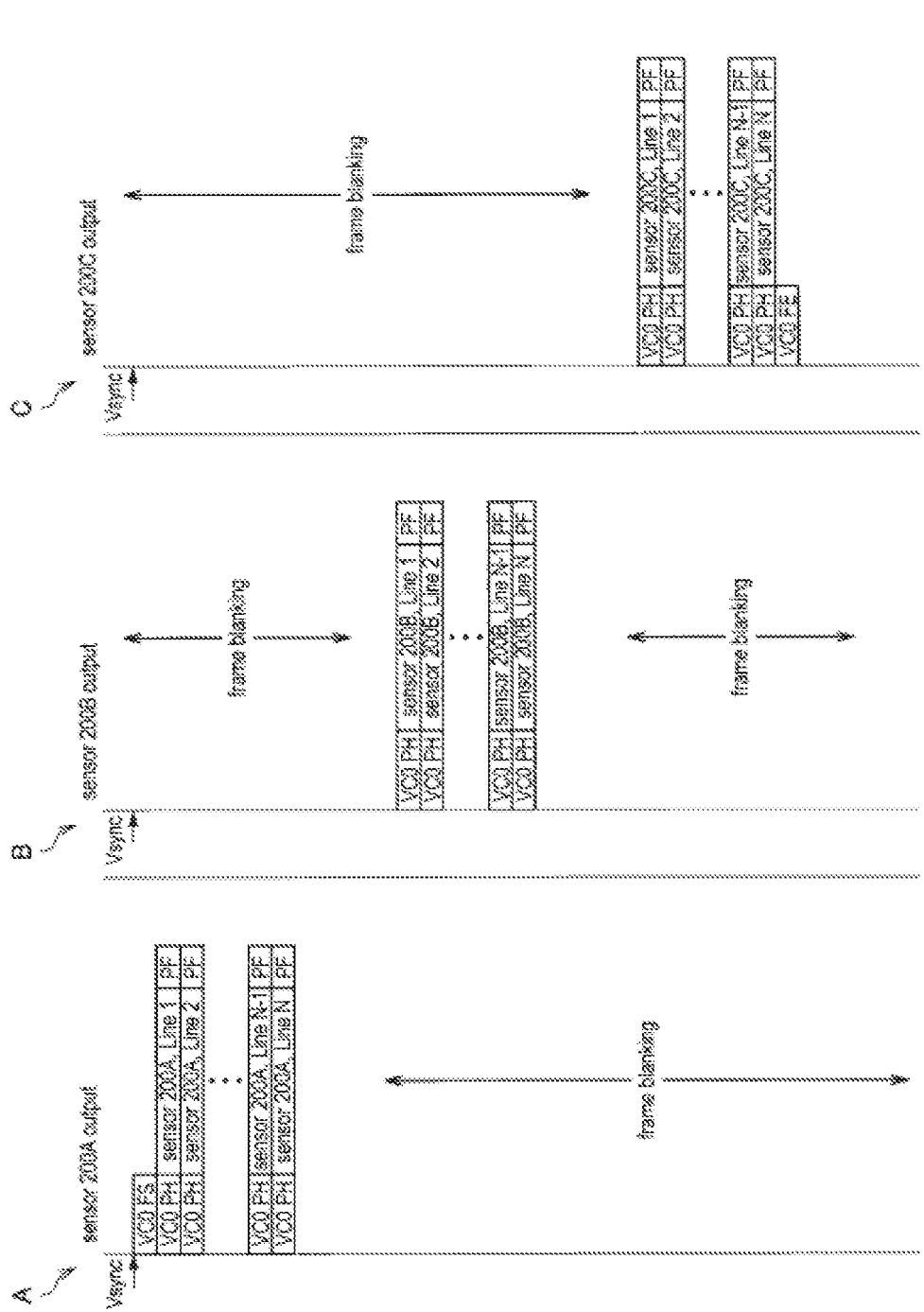
[FIG. 14]

[FIG. 15]
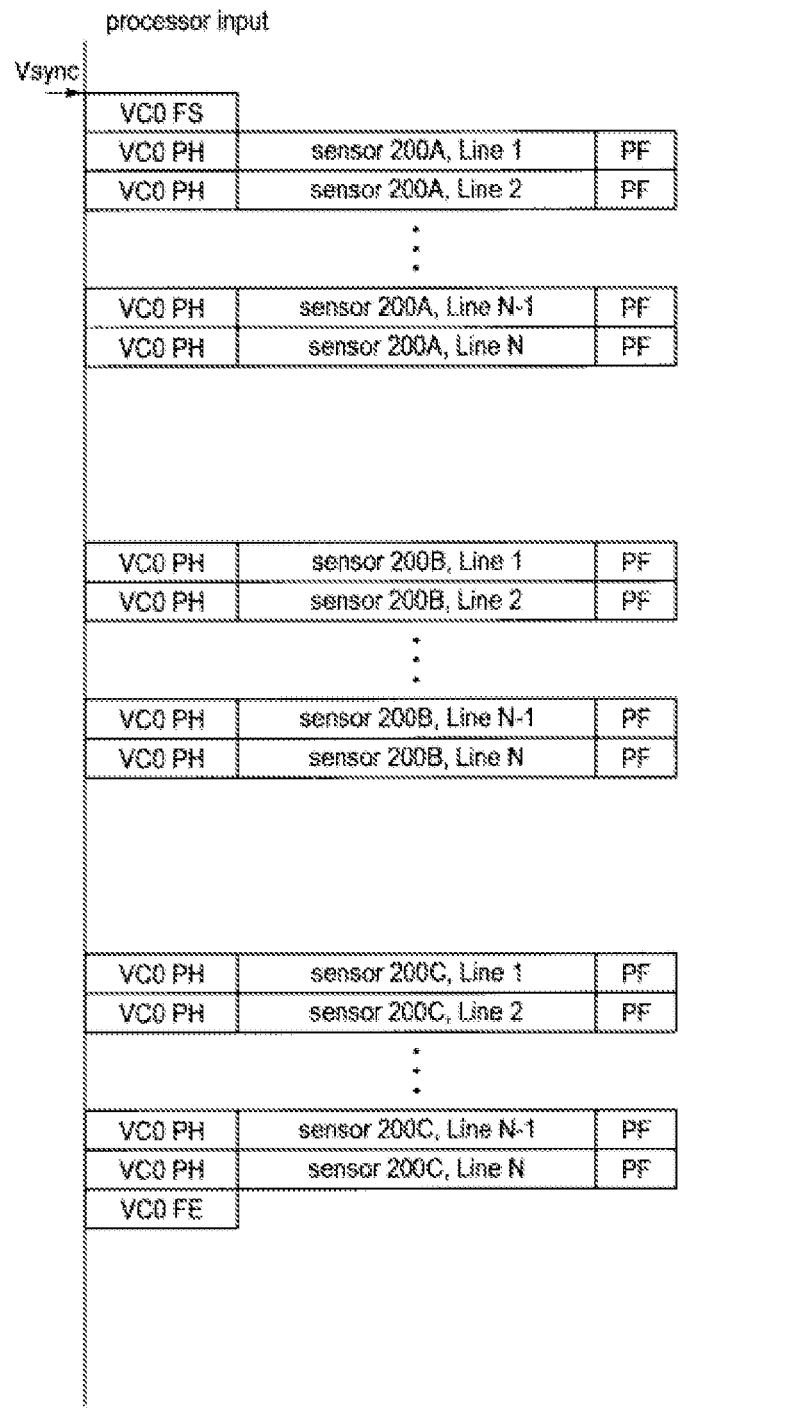

[FIG. 16]

| VC0 frame buffer | frame buffer on memory |
| --- | --- |
| | sensor 200A, Line 1 |
| | sensor 200A, Line 2 |
| | ⋮ |
| | sensor 200A, Line N-1 |
| | sensor 200A, Line N |
| | sensor 200B, Line 1 |
| | sensor 200B, Line 2 |
| | ⋮ |
| | sensor 200B, Line N-1 |
| | sensor 200B, Line N |
| | sensor 200C, Line 1 |
| | sensor 200C, Line 2 |
| | ⋮ |
| | sensor 200C, Line N-1 |
| | sensor 200C, Line N |

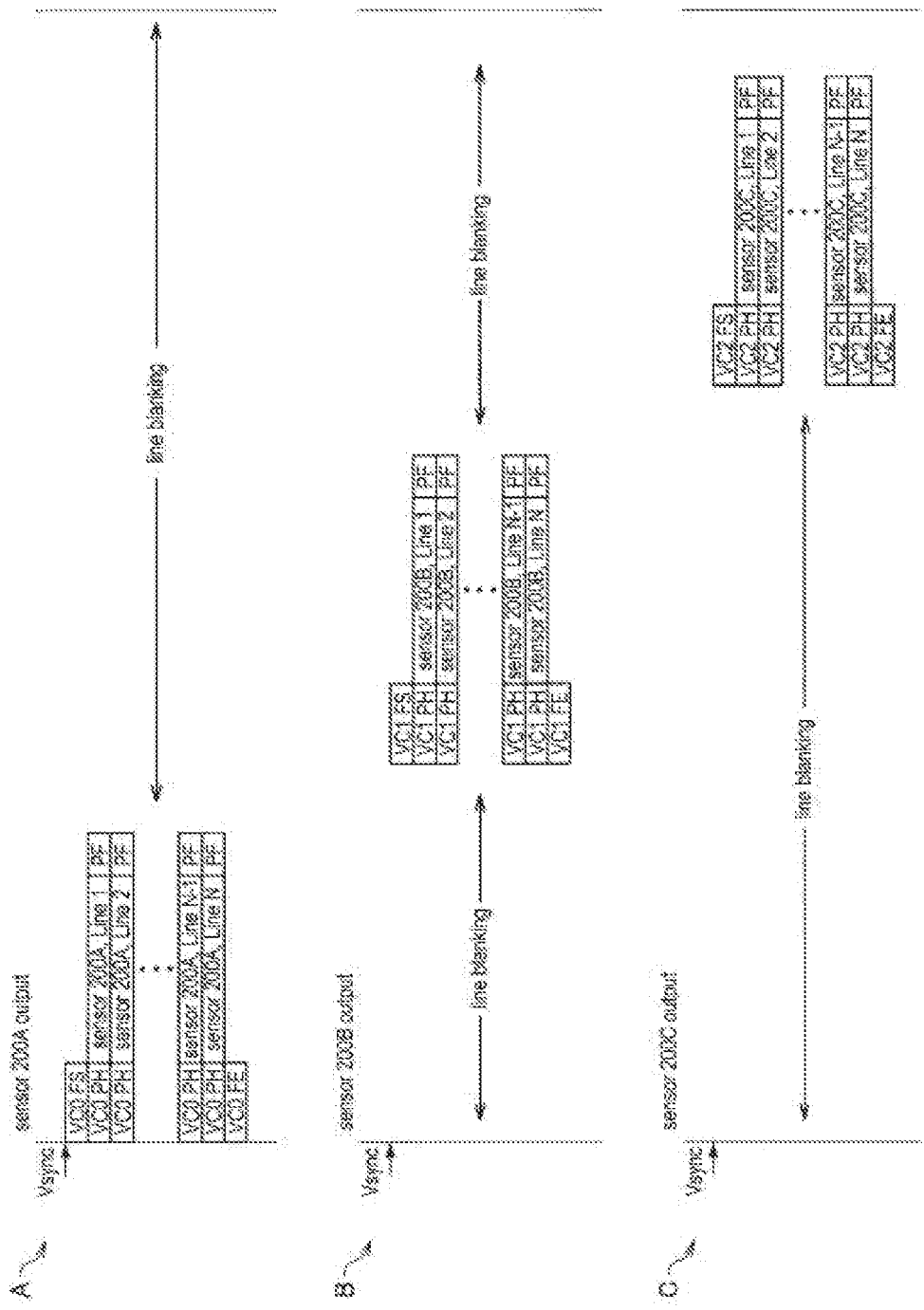

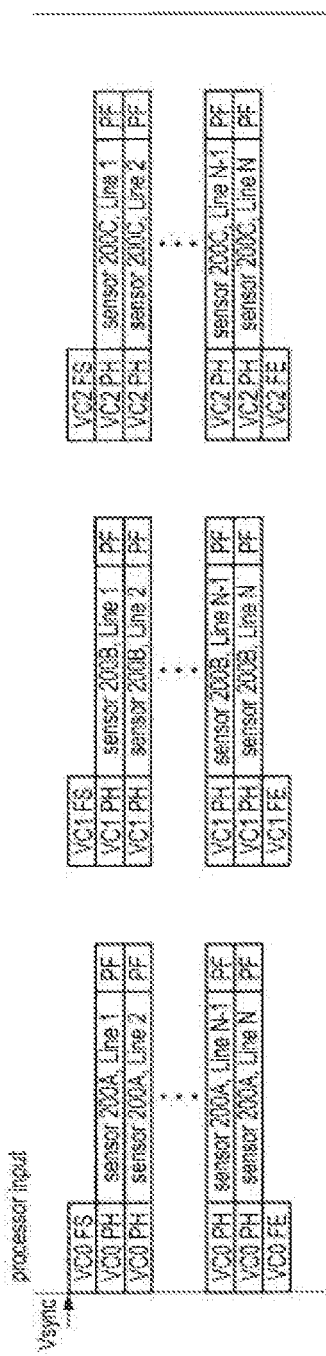
[FIG. 18]

[FIG. 19]
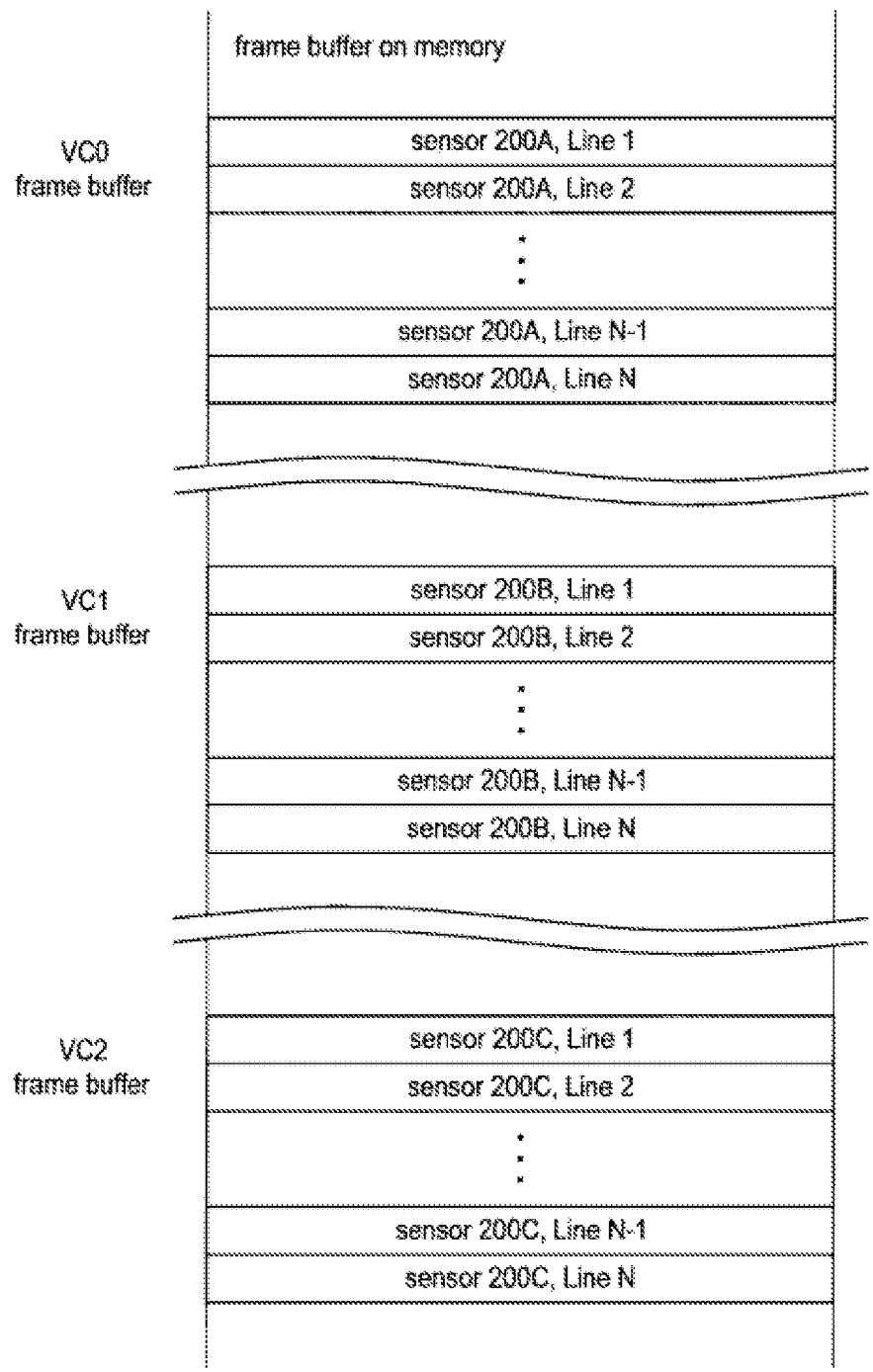

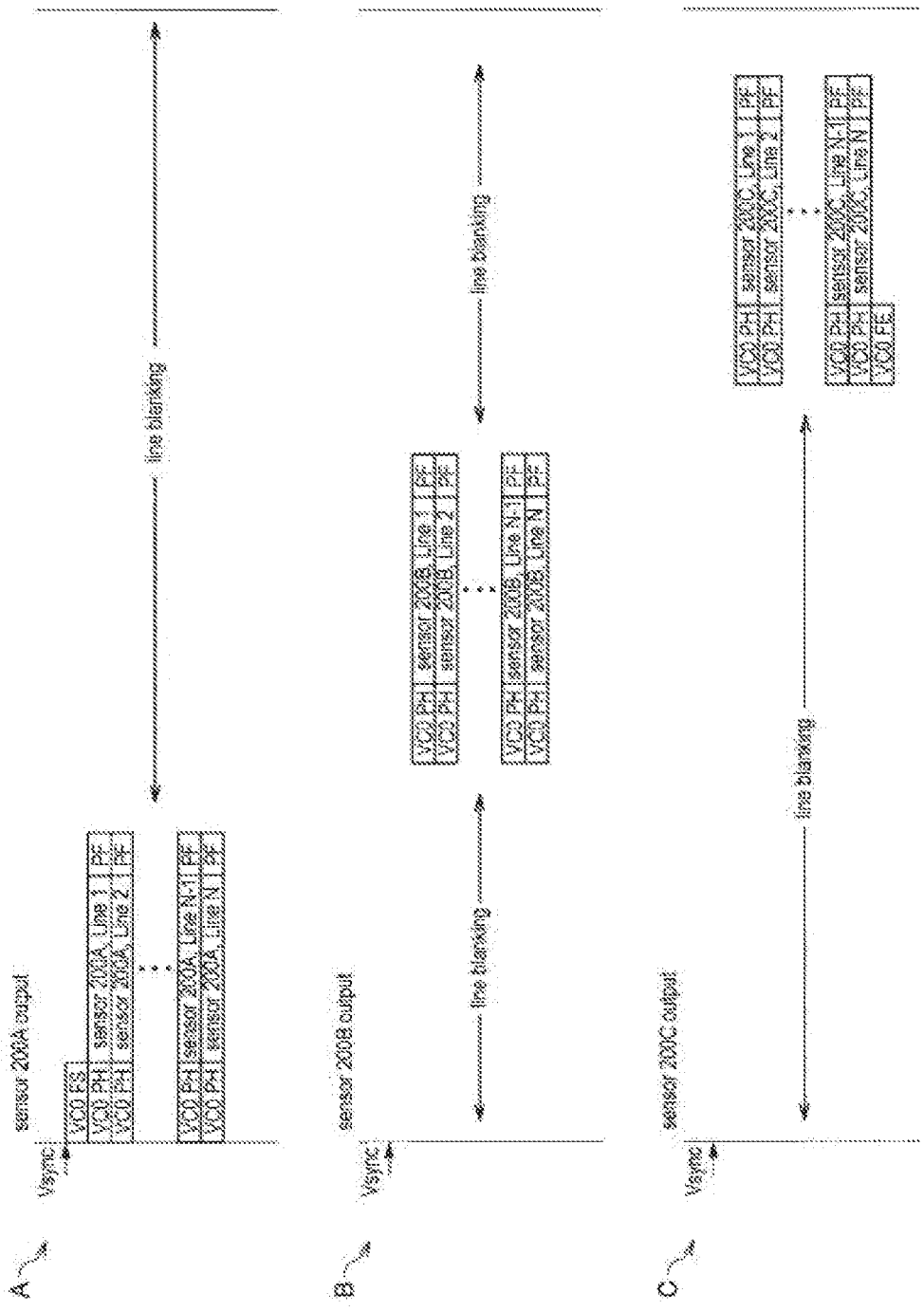
[FIG. 20]

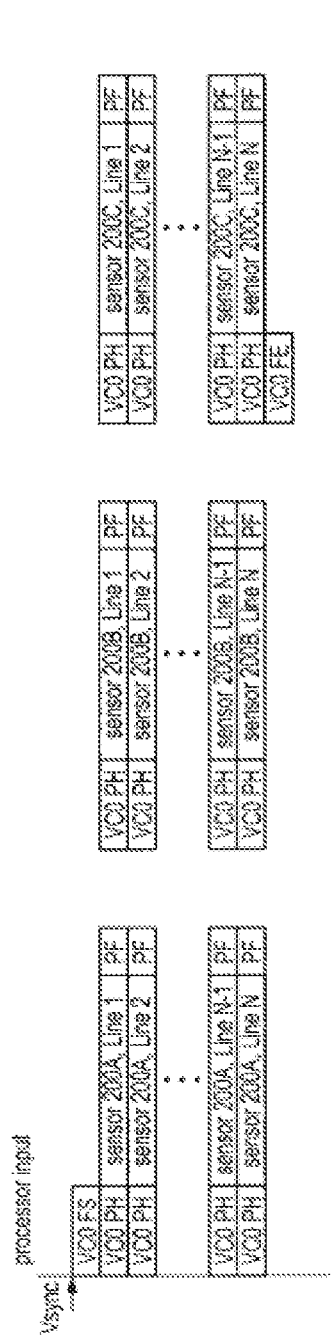
[FIG. 21]

[FIG. 22]

| frame buffer on memory | | | | | | | | | | | |
|---|---|---|---|---|---|---|---|---|---|---|---|
| sensor 200A, Line 1 | sensor 200A, Line 2 | ... | sensor 200A, Line N-1 | sensor 200A, Line N | sensor 200B, Line 1 | sensor 200B, Line 2 | ... | sensor 200B, Line N-1 | sensor 200B, Line N | sensor 200C, Line 1 | sensor 200C, Line 2 | ... | sensor 200C, Line N-1 | sensor 200C, Line N |

VCD frame buffer

PROCESSING APPARATUS, IMAGE SENSOR, AND SYSTEM

CROSS REFERENCE TO RELATED APPLICATIONS

The present application is a Continuation of application Ser. No. 16/094,135, filed Oct. 16, 2018, which claims the benefit of Japanese Priority Patent Application JP 2016-105353 filed May 26, 2016, the entire contents of which are incorporated herein by reference.

TECHNICAL FIELD

The present disclosure relates to processing apparatuses, image sensors, and systems.

BACKGROUND ART

Technologies for connection between devices, such as, for example, connection between a processor and a sensor, have been developed. Among such technologies for connection between devices is, for example, a technique disclosed in PTL1 described below.

CITATION LIST

Patent Literature

[PTL 1]
US 2014/0281753A

SUMMARY

Technical Problem

For example, trends toward improved performance, multifunctionality, and the like of electronic apparatuses, particularly those including a processing apparatus, such as a processor or the like, have been accompanied by some electronic apparatuses including a plurality of image sensors. It is desirable that such electronic apparatuses including a processing apparatus should have a reduced number of data buses which are connected to the processing apparatus. The reduction of the number of data buses connected to the processing apparatus could lead to the following.

A wiring region where the processing apparatus and the plurality of image sensors are connected together is reduced.

The hardware configuration of the processing apparatus is simplified.

Here, as a standard for connecting a processor (an example of the processing apparatus, the same applies in the description that follows) and an image sensor together by a data bus (signal transmission path), there is the Camera Serial Interface 2 (CSI-2) standard of the Mobile Industry Processor Interface (MIPI) Alliance. The CSI-2 standard is a standard for connecting a processor and an image sensor together by a data bus in one-to-one correspondence. In existing standards such as the CSI-2 standard and the like, it is not assumed that "a processor and a plurality of image sensors are connected together on a data bus." Therefore, when an existing standard such as the CSI-2 standard is simply employed to connect a processor and each of a plurality of image sensors by a data bus, the number of data buses connected to the processor is equal to the number of the image sensors. Therefore, when an existing standard such as the CSI-2 standard is simply employed, it is difficult to reduce the wiring region and the number of data buses connected to the processor.

In the present disclosure, proposed are a novel and improved processing apparatus, image sensor, and system in which a processing apparatus can be connected to a plurality of image sensors by a reduced number of data buses.

Solution to Problem

According to an embodiment of the present disclosure, there is provided a processing apparatus including a processing unit that is connected to a data bus, and performs control involved with an image which is output by each of a plurality of image sensors connected to the data bus, through the data bus.

In addition, according to an embodiment of the present disclosure, there is provided an image sensor that is connected to a data bus to which another image sensor is connected, and outputs an image on the basis of control information.

In addition, according to an embodiment of the present disclosure, there is provided a system including: a plurality of image sensors each of which is connected to a data bus; and a processing apparatus that is connected to the data bus. The processing apparatus includes a processing unit that performs control involved with an image which is output by each of the image sensors through the data bus.

Advantageous Effects of Invention

According to the embodiments of the present disclosure, a processing apparatus and a plurality of image sensors can be connected together by a reduced number of data buses.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram showing an example of a configuration of a system according to the present embodiment.

FIG. 2A is an explanatory diagram for describing an example of control involved with an image in a processor included in a system according to the present embodiment.

FIG. 2B is an explanatory diagram for describing an example of control involved with an image in a processor included in a system according to the present embodiment.

FIG. 2C is an explanatory diagram for describing an example of control involved with an image in a processor included in a system according to the present embodiment.

FIG. 2D is an explanatory diagram for describing an example of control involved with an image in a processor included in a system according to the present embodiment.

FIG. 2E is an explanatory diagram for describing an example of control involved with an image in a processor included in a system according to the present embodiment.

FIG. 3 is an explanatory diagram showing a configuration example of a sensor included in a system according to the present embodiment.

FIG. 4 shows an example of image data generated by a sensor 200 included in a system according to the present embodiment.

FIG. 5 shows an example of a packet sequence of image data which is transmitted through a data bus included in a system according to the present embodiment.

FIG. 6 shows a packet format specified in the CSI-2 standard.

FIG. 7 shows a packet format specified in the CSI-2 standard.

FIG. 8 shows an example of a frame buffer allocated in a memory included in a system according to the present embodiment.

FIG. 9 is an explanatory diagram showing a packet structure example of image data output from a sensor by a processor included in a system according to the present embodiment performing control involved with an image.

FIG. 10 is a flowchart showing an example of a process involved in control involved with an image (a process involved in a control method according to the present embodiment) in a processor included in a system according to the present embodiment.

FIG. 11 shows a first example of a packet sequence of image data output by each of a plurality of sensors included in a system according to the present embodiment.

FIG. 12 shows a first example of packet sequences received by a processor included in a system according to the present embodiment.

FIG. 13 shows a first example of a packet sequence of image data stored in a frame buffer in a memory included in a system according to the present embodiment.

FIG. 14 shows a second example of a packet sequence of image data output by each of a plurality of sensors included in a system according to the present embodiment.

FIG. 15 shows a second example of packet sequences received by a processor included in a system according to the present embodiment.

FIG. 16 shows a second example of a packet sequence of image data stored in a frame buffer in a memory included in a system according to the present embodiment.

FIG. 17 shows a third example of a packet sequence of image data output by each of a plurality of sensors included in a system according to the present embodiment.

FIG. 18 shows a third example of packet sequences received by a processor included in a system according to the present embodiment.

FIG. 19 shows a third example of a packet sequence of image data stored in a frame buffer in a memory included in a system according to the present embodiment.

FIG. 20 shows a fourth example of a packet sequence of image data output by each of a plurality of sensors included in a system according to the present embodiment.

FIG. 21 shows a fourth example of packet sequences received by a processor included in a system according to the present embodiment.

FIG. 22 shows a fourth example of a packet sequence of image data stored in a frame buffer in a memory included in a system according to the present embodiment.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description that follows will be provided in the following order.

1. Configuration of System According to the Present Embodiment

2. Output Example of Image in System According to the Present Embodiment

3. Program According to the Present Embodiment (Configuration of System According to the Present Embodiment)

FIG. 1 is an explanatory diagram showing an example of a configuration of a system 1000 according to the present embodiment. Examples of the system 1000 include communication apparatuses (e.g., a smartphone, etc.), mobile apparatuses (e.g., a drone (an apparatus which can be remotely operated or autonomously operate), automobile, etc.), and the like. Note that application examples of the system 1000 are not limited to those described above. Other application examples of the system 1000 will be described below.

The system 1000 has, for example, a processor 100 (a processing apparatus according to the present embodiment), a plurality of sensors 200A, 200B, 200C, . . . (an image sensor according to the present embodiment) which have a function of outputting an image, a memory 300, and a display device 400. The plurality of sensors 200A, 200B, 200C, . . . may be collectively referred to as "sensors 200," or one of the plurality of sensors 200A, 200B, 200C, . . . may be representatively referred to as a "sensor 200."

Although the system 1000 shown in FIG. 1 has three or more sensors 200, the number of sensors 200 included in the system according to the present embodiment is not limited to the example shown in FIG. 1. For example, the system according to the present embodiment may have any number of sensors 200 that are at least two sensors 200, such as two sensors 200, three sensors 200, or the like. In the description that follows, for the sake of convenience, a case where an image is output by two of the plurality of sensors 200 included in the system 1000, or a case where an image is output by three of the plurality of sensors 200 included in the system 1000, will be described by way of example.

The processor 100 and of the respective sensors 200 are electrically connected together by a single data bus B1. The data bus B1 is a single signal transmission path which connects the processor 100 and the respective sensors 200 together. For example, data indicating an image output by each sensor 200 (may hereinafter be referred to as "image data") is transmitted from the sensor 200 to the processor 100 through the data bus B1.

In the system 1000, a signal is transmitted through the data bus B1 in accordance with any standard in which the start and end of data which is transmitted are specified by predetermined data, such as the CSI-2 standard, PCI Express, or the like.

Examples of the predetermined data include a frame start packet in the CSI-2 standard, a frame end packet in the CSI-2 standard, and the like. In the description that follows, an example will be described in which a signal is transmitted through the data bus B1 in accordance with the CSI-2 standard.

The processor 100 and the respective sensors 200 are also connected together by a control bus B2 different from the data bus B1. The control bus B2 is another signal transmission path which connects the processor 100 and the respective sensors 200 together. For example, control information (described below) which is output by the processor 100 is transmitted from the processor 100 to the sensors 200 through the control bus B2. In the description that follows, an example will be described in which, as in the case of the data bus B1, a signal is transmitted through the control bus B2 in accordance with the CSI-2 standard. Although FIG. 1 shows the example in which the processor 100 and the respective sensors 200 are connected together by the single control bus B2, the system according to the present embodiment can have a configuration in which a separate control bus is provided for each sensor 200. Also, the present disclosure is not limited to the configuration in which the processor 100 transmits and receives control information (described below) to and from the respective sensors 200 through the control bus B2. Alternatively, for example, a configuration may be employed in which control information (described below) is transmitted and received through wireless communication having any communication scheme that can be used to transmit and receive control information (described below).

<1> Processor 100 (Processing Apparatus According to the Present Embodiment)

The processor 100 includes one or more processors, various processing circuits, or the like which include a computation circuit, such as a microprocessing unit (MPU) or the like. The processor 100 is driven with power supplied from an internal power supply (not shown), such as a battery or the like, included in the system 1000, or power supplied from a power supply external to the system 1000.

The processor 100 is an example of the processing apparatus according to the present embodiment. The processing apparatus according to the present embodiment is applicable to any circuits and devices that can perform a process (process involved in a control method according to the present embodiment) performed by a processing unit described below.

The processor 100 performs "control involved with an image which is output through the data bus B1 by each of the plurality of sensors 200 connected to the data bus B1 (control involved in the control method according to the present embodiment)."

The control involved with an image is performed by, for example, a processing unit 102 included in the processor 100. In the processor 100, a specific processor (or a specific processing circuit) or a plurality of processors (or a plurality of processing circuits) which perform the control involved with an image, function as the processing unit 102.

Note that the processing unit 102 is in charge of a portion of the functionality of the processor 100 for the sake of convenience. Therefore, in the processor 100, for example, the control involved with an image according to the present embodiment may be performed by a plurality of functional blocks. In the description that follows, an example will be described in which the control involved with an image according to the present embodiment is performed by the processing unit 102.

<1-1> Example of Control of Image According to the Present Embodiment

The processing unit 102 performs the control involved with an image by transmitting control information to each sensor 200.

The control information according to the present embodiment includes, for example, identification information indicating a sensor 200, and information for controlling the sensor 200. The identification information according to the present embodiment is, for example, any data that can be used to identify a sensor 200, such as an ID set for the sensor 200 or the like. A specific example of information for control according to the present embodiment will be described below.

The control information is transmitted through, for example, the control bus B2 as described above.

Also, the control information transmitted by the processing unit 102 is recorded into, for example, a register (an example of a recording medium) included in each sensor 200. The sensors 200 output an image on the basis of the control information stored in the respective registers, as described below.

The processing unit 102 performs, as the control involved with an image, for example, any of control according to a first example shown in (1) below to control according to a fourth example shown in (4). Note that an output example of an image in the system 1000 which is achieved by the control involved with an image according to the present embodiment, will be described below.

(1) First Example of Control Involved with Image: Control for Joining Images

The processing unit 102 controls joining of a plurality of images output by the sensors 200.

More specifically, the processing unit 102 controls joining of a plurality of images output by the sensors 200 by, for example, controlling the frame start and frame end of each image.

The start of a frame in each sensor 200 is controlled by, for example, the processing unit 102 controlling the output of the start packet of the frame in the sensor 200. The start packet of a frame is, for example, a "frame start (FS)" packet in the CSI-2 standard. In the description that follows, the frame start packet may be indicated by an "FS" or "FS packet."

The processing unit 102 controls the output of a frame start packet by a sensor 200 by, for example, transmitting, to the sensor 200, control information containing data (first output information, an example of information for control) indicating whether or not a frame start packet is to be output. The data indicating whether or not a frame start packet is to be output is, for example, a flag indicating whether or not a frame start packet is to be output.

Also, the end of a frame in each sensor 200 is controlled by, for example, the processing unit 102 controlling the output of the end packet of the frame in the sensor 200. The end packet of a frame is, for example, a "frame end (FE) packet" in the CSI-2 standard. In the description that follows, the frame end packet may be indicated by an "FE" or "FE packet."

The processing unit 102 controls the output of a frame end packet in a sensor 200 by, for example, transmitting, to the sensor 200, control information containing data indicating whether or not a frame end packet is to be output (second output information, an example of information for control). The data indicating whether or not a frame end packet is to be output is, for example, a flag indicating whether or not a frame end packet is to be output.

For example, the following data indicating an image is output from a plurality of sensors 200 by the processing unit 102 controlling the frame start and frame end of each of a plurality of images output by the sensors 200 as described above.

Data containing a frame start packet and a frame end packet

Data containing only a frame start packet

Data containing only a frame end packet

Data containing neither a frame start packet nor a frame end packet

The processor 100 which receives a plurality of images which are transmitted from a plurality of sensors 200 through the data bus B1 recognizes that transmission of an image in a frame has been started, on the basis of a frame start packet contained in the received image.

Also, the processor 100 recognizes that transmission of an image in a certain frame has been ended, on the basis of a frame end packet contained in the received image.

Also, when neither a frame start packet nor a frame end packet is contained in a received image, the processor 100 does not recognize that transmission of an image in a certain frame has been started or that transmission of an image in a certain frame has been ended. Note that, in the above case, the processor 100 may recognize that transmission of an image in a certain frame is being performed.

Thus, in the processor 100 which receives a plurality of images which are transmitted from a plurality of sensors 200 through the data bus B1, processes shown in (a) and (b) below are achieved. Note that when another processing circuit which can process an image is connected to the data bus B1, images output by a plurality of sensors 200 may be processed by that processing circuit. In the description that follows, a case where the processing unit 102 included in the processor 100 processes images output from a plurality of sensors 200 will be described by way of example.

(a) First Example of Process of Images Output by Sensors 200

When data transmitted from a sensor 200 contains a frame start packet and a frame end packet, the processing unit 102 processes an image output by that sensor 200 as a single image.

(b) Second Example of Process of Images Output by Sensors 200

When "data output by a sensor 200 contains a frame start packet, and data received from another sensor 200 after reception of the data containing a frame start packet contains a frame end packet," the processing unit 102 combines an image in the data containing a frame start packet and an image in the data containing a frame end packet together.

Also, when "data containing neither a frame start packet nor a frame end packet which is transmitted from one or more other sensors 200 before reception of data containing a frame end packet in the above case of the second example," the processing unit 102 combines an image in the data containing a frame start packet, an image in the data containing neither a frame start packet nor a frame end packet, and an image in the data containing a frame end packet together.

The processing unit 102 combines images transmitted from a plurality of sensors 200 together on the basis of a frame start packet and a frame end packet as described above. Thus, a plurality of images transmitted from a plurality of sensors 200 can be joined.

Note that the control of joining a plurality of images according to the present embodiment is not limited to the above example.

For example, the processing unit 102 can control addition of identifiers to a plurality of images output by a plurality of sensors 200 to control joining of the plurality of images.

Here, the identifier according to the present embodiment is data which can be used to identify an image output by a sensor 200. The identifier according to the present embodiment is, for example, one or both of a virtual channel (VC) value (may also referred to be as a "VC number") defined in the CSI-2 standard and a data type (DT) value defined in the CSI-2 standard. Note that the identifier according to the present embodiment is not limited to the above example, and may be any data that can be used to identify an image in the control of joining of a plurality of images transmitted from a plurality of sensors 200.

The processing unit 102 controls addition of an identifier to an image output by a sensor 200 by, for example, transmitting, to the sensor 200, control information containing data (third output information, an example of information for control) indicating the identifier of the image.

When data transmitted from sensor 200 contains an identifier, the processing unit 102 recognizes images in a certain frame to which different identifiers are added are the images different from each other. In other words, when data transmitted from a sensor 200 contains an identifier, the processing unit 102 does not join images to which different identifiers are added.

Thus, the processing unit 102 controls addition of identifiers to a plurality of images output by the sensors 200, in addition of the control of frame start and frame end. Therefore, joining of images can be controlled in a wider variety of manners, compared to when only frame start and frame end are controlled.

FIG. 2A to FIG. 2E are explanatory diagrams for describing an example of the control involved with an image in the processor 100 included in the system 1000 according to the present embodiment. FIG. 2A to FIG. 2E each show an example of the result of control of joining of images in the processor 100.

(1-1) First Example of Result of Control of Joining of Images: FIG. 2A

Part A of FIG. 2A shows an example of data corresponding to certain frames which is acquired by the processor 100 from two sensors 200 through the data bus B1. Part A of FIG. 2A shows an example in which the following data is received from one sensor 200 and the other sensor 200.

One sensor 200: data containing image data for each line, a frame start packet, a frame end packet, and a VC value "0" (an identifier example, the same applies in the description that follows)

The other sensor 200: data containing image data for each line, a frame start packet, a frame end packet, and a VC value "1" (an identifier example, the same applies in the description that follows)

Also, part B of FIG. 2A shows an image of storage in a case where the data shown in part A of FIG. 2A is stored in a frame buffer of the memory 300. Note that the data shown in part A of FIG. 2A may be stored in other recording media, such as a recording medium included in the processor 100 and the like.

When the data shown in part A of FIG. 2A is received, the processing unit 102 records separate images into frame buffers for the respective different VC values as shown in part B of FIG. 2A, for example.

(1-2) Second Example of Result of Control of Joining of Images: FIG. 2B

Part A of FIG. 2B shows an example of data corresponding to certain frames which is acquired by the processor 100 from two sensors 200 through the data bus B1. Part A of FIG. 2B shows an example in which the following data is received from one sensor 200 and the other sensor 200.

One sensor 200: data containing image data for each line, a frame start packet, a frame end packet, and a VC value "0"

The other sensor 200: data containing image data for each line, a frame start packet, a frame end packet, and a VC value "0"

When the data shown in part A of FIG. 2B is received, the processing unit 102 records images into frame buffers for the same VC value, as shown in part B of FIG. 2B, for example. The storage of images shown in part B of FIG. 2B is achieved by, for example, double buffering or the like.

(1-3) Third Example of Result of Control of Joining of Images: FIG. 2C

Part A of FIG. 2C shows an example of data corresponding to certain frames which is acquired by the processor 100 from two sensors 200 through the data bus B1. Part A of FIG. 2C shows an example in which the following data is received from one sensor 200 and the other sensor 200.

One sensor 200: data containing image data for each line, a frame start packet, and a VC value "0"

The other sensor 200: data containing image data for each line, a frame end packet, and a VC value "0"

When the data shown in part A of FIG. 2C is received, the processing unit 102 joins two images together in the vertical direction, and records the resultant image into a frame buffer as shown in part B of FIG. 2C, for example.

(1-4) Fourth Example of Result of Control of Joining of Images: FIG. 2D

Part A of FIG. 2D shows an example of data corresponding to certain frames which is acquired by the processor 100 from two sensors 200 through the data bus B1. Part A of FIG. 2D shows an example in which the following data is received from one sensor 200 and the other sensor 200.

One sensor 200: data containing image data for each line, a frame start packet, a frame end packet, and a VC value "0"

The other sensor 200: data containing image data for each line, a frame start packet, a frame end packet, and a VC value "1"

When the data shown in part A of FIG. 2D is received, the processing unit 102 records separate images into frame buffers for the respective different VC values as shown in part B of FIG. 2D, for example.

(1-5) Fifth Example of Result of Control of Joining of Images: FIG. 2E Part A of FIG. 2E shows an example of data corresponding to certain frames which is acquired by the processor 100 from two sensors 200 through the data bus B1. Part A of FIG. 2E shows an example in which the following data is received from one sensor 200 and the other sensor 200.

One sensor 200: data containing image data for each line, a frame start packet, and a VC value "0"

The other sensor 200: data containing image data for each line, a frame end packet, and a VC value "0"

When the data shown in part A of FIG. 2E is received, the processing unit 102 joins two images together in the horizontal direction, and records the resultant image into a frame buffer as shown in part B of FIG. 2E, for example.

The control of joining of images by the processing unit 102 of the processor 100 allows for selective joining of images as shown in FIG. 2A to FIG. 2E, for example. Note that, needless to say, examples of the result of control of joining of images by the processing unit 102 of the processor 100 according to the present embodiment are not limited to those shown in FIG. 2A to FIG. 2E.

(2) Second Example of Control Involved with Image: Control of Image to be Output The processing unit 102 controls images to be output by sensors 200. The control of images to be output by sensors 200 according to the present embodiment is, for example, one or both of control of sizes of images to be output by a plurality of sensors 200, and control of frame rates of images to be output by a plurality of sensors 200.

For example, the processing unit 102 transmits control information containing one or both of data indicating an image size and data indicating a frame rate (an example of information for control) to a sensor 200, to control an image to be output by the sensor 200.

(3) Third Example of Control Involved with Image: Control of Image to be Output

The processing unit 102 controls an output timing of an image to be output by each sensor 200.

For example, the processing unit 102 transmits, to a sensor 200, control information containing data (an example of information for control) indicating the amount of an output delay from reception of an instruction to output an image until output of the image to control an output timing of the image to be output by the sensor 200.

(4) Fourth Example of Control Involved with an Image

The processing unit 102 may perform two or more of the control according to the first example described above in (1) to the control according to the third example described in (3).

For example, the processing unit 102 performs, as the control involved with an image, the control according to the first example described above in (1) to the control according to the fourth example described above in (4).

For example, the processor 100 includes the processing unit 102 to perform the above processes involved in the control involved with an image (a process involved in the control method according to the present embodiment).

Note that processes performed by the processor 100 are not limited to the above processes involved in the control involved with an image.

For example, as described above with reference to FIG. 2A to FIG. 2E, the processor 100 can perform various processes such as a process involved in control of recording of image data into a recording medium such as the memory 300 or the like, a process involved in control of displaying of an image on a display screen of the display device 400, a process of executing any application software, and the like. The process involved in control of recording is, for example, a "process of transferring control data containing a record instruction and data to be recorded into a recording medium, to a recording medium such as the memory 300 or the like." Also, the process involved in control of displaying is, for example, a "process of transferring control data containing a display instruction and data to be displayed on a display screen, to a display device such as the display device 400 or the like."

<2> Sensor 200 (Image Sensor According to the Present Embodiment)

The sensors 200 are an image sensor. The image sensor according to the present embodiment includes, for example, an imaging device, such as a digital still camera, digital video camera, stereo camera, or the like, or any sensor device, such as an infrared sensor, range imaging sensor, or the like, to have a function of outputting a generated image. Here, an image generated by the sensor 200 corresponds to data indicating the result of sensing performed by the sensor 200.

For example, as shown in FIG. 1, a sensor 200 is connected to the data bus B1 to which other sensors 200 are connected.

Also, the sensor 200 outputs an image on the basis of control information. As described above, control information is transmitted from the processor 100, and is then received by the sensor 200 through the control bus B2.

FIG. 3 is an explanatory diagram showing a configuration example of the sensor 200 included in the system 1000 according to the present embodiment. The sensor 200 has, for example, a processor 250, a ROM 252, a register 254, a sensor device 256, and a communication device 258. Also, these constituent elements in the sensor 200 are connected together by, for example, an internal bus 260. The sensor 200 is driven by power supplied from an internal power supply (not shown), such as a battery or the like, included in the system 1000, or power supplied from a power supply external to the system 1000.

The processor 250 has a function of controlling the entire sensor 200. Examples of the control performed by the processor 250 include control of recording of received control information into the register 254, control of operation of the sensor device 256, control of communication of the communication device 258, and the like.

A process example involved in the control of recording of received control information is a "process of comparing identification information contained in the received control information with identification information 270 stored in the ROM 252, and on the basis of the result of the comparison, selectively recording the received control information into the register 254." For example, when the identification information contained in the received control information matches the identification information 270 stored in the ROM 252, the processor 250 selectively records the received control information into the register 254.

A process example involved in the control of operation of the sensor device 256 is a "process of transferring, to the sensor device 256 a control signal containing an instruction to operate the sensor device 256, regularly or irregularly, or when receiving the control information containing a sensing instruction."

A process example involved in the control of communication of the communication device 258 is a "process of transferring a control signal containing a transmit instruction and data to be transmitted, to the communication device 258."

The ROM 252 is a recording medium included in the sensor 200. The ROM 252 stores, for example, identification information.

The register 254 is another recording medium included in the sensor 200. The register 254 stores, for example, control information received through the control bus B2. Although FIG. 3 shows an example in which control information is stored in the register 254, control information may be stored in other recording media, such as non-volatile memories (e.g., a flash memory, etc.), magnetic recording media (e.g., a hard disk, etc.), and the like.

The sensor device 256 is a device which generates an image. Examples of the sensor device 256 include imaging devices, such as a digital still camera, digital video camera, and the like, and any sensor devices, such as an infrared sensor, range imaging sensor, and the like.

The communication device 258 is, for example, a device which communicates with an external device through connected external buses such as the data bus B1, the control bus B2, and the like. The communication device 258 is, for example, a device which can perform communication compliant with any standard in which the start and end of data to be transmitted are specified by predetermined data, such as the CSI-2 standard, PCI Express, or the like.

The sensor 200 has, for example, the configuration shown in FIG. 3 to output an image on the basis of control information. Note that, needless to say, the configuration of the sensor 200 is not limited to the example shown in FIG. 3.

The processes in the sensor 200 involved with outputting of an image on the basis of control information will be more specifically described. The sensor 200 performs, as the processes involved with outputting of an image on the basis of control information, one or more of an output process according to a first example described below in (I) to an output process according to a fifth example described below in (V), for example. The processes in the sensor 200 involved with outputting of an image on the basis of control information is, for example, performed by the processor 250 included in the sensor 200 looking up control information 272 stored in the register 254.

(I) Output Process According to First Example: Case where Control Information Contains Data (First Output Information) Indicating whether or not Frame Start Packet is to be Output When control information contains data indicating whether or not a frame start packet is to be output, the sensor 200 selectively outputs a frame start packet on the basis of the data indicating whether or not a frame start packet is to be output.

For example, when the data indicating whether or not a frame start packet is to be output indicates that a frame start packet is to be output, the sensor 200 outputs a frame start packet together with an image.

(II) Output Process According to Second Example: Case where Control Information Contains Data (Second Output Information) Indicating whether or not Frame End Packet is to be Output.

When the control information contains data indicating whether or not a frame end packet is to be output, the sensor 200 selectively outputs a frame end packet on the basis of the data indicating whether or not a frame end packet is to be output.

For example, when the data indicating whether or not a frame end packet is to be output indicates that a frame end packet is to be output, the sensor 200 outputs a frame end packet together with an image.

(III) Output Process According to Third Example: Case where Control Information Contains Data (third Output Information) Indicating Identifier of Image When control information contains data indicating an identifier of an image, the sensor 200 outputs the identifier indicated by the data indicating the identifier of the image together with the image. A specific example of the output of an identifier by the sensor 200 will be described below.

(IV) Output Process According to Fourth Example: Case where Control Information Contains One or Both of Data Indicating Image Size and Data Indicating Frame Rate When control information contains data indicating an image size, the sensor 200 outputs an image having the image size indicated by the control information.

Also, when control information contains data indicating a frame rate, the sensor 200 outputs an image at the frame rate indicated by the control information.

Also, when control information contains data indicating an image size and data indicating a frame rate, the sensor 200 outputs an image having the image size indicated by the control information at the frame rate indicated by the control information.

(V) Output Process According to Fifth Example: Case where Control Information Contains Data Indicating Output Delay Amount When control information contains data indicating an output delay amount, the sensor 200 outputs an image after a period of time corresponding to the output delay amount indicated by the control information has elapsed since reception of an instruction to output an image through the control bus B2, for example.

The sensor 200 performs one or more of the output process according to the first example described above in (I) to the output process according to the fifth example described above in (V), for example. Therefore, in the system 1000, the processor 100 causes each sensor 200 to output an image based on control information set in the sensor 200. Thereafter, in the system 1000, the image output by each sensor 200 through the data bus B1 is received by the processor 100, as shown in part A of FIG. 2A to part A of FIG. 2E, for example.

<3> Memory 300

The memory 300 is a recording medium included in the system 1000. Examples of the memory 300 include volatile memories (e.g., a random access memory, etc.), non-volatile memories (e.g., a flash memory, etc.), and the like.

The memory 300 stores an image output by each sensor 200 as shown in part B of FIG. 2A to part B of FIG. 2E, for example. The recording of an image into the memory 300 is controlled by, for example, the processor 100.

<4> Display Device 400

The display device 400 is a display device included in the system 1000. Examples of the display device 400 include a liquid crystal display, organic electro-luminescence (EL) display, organic light emitting diode (OLED) display, and the like.

The display screen of the display device 400 displays various images and screens, such as, for example, an image output by each sensor 200, a screen involved with an application executed by the processor 100, a screen involved with user interface (UI), and the like. The display of an image or the like on the display screen of the display device 400 is controlled by, for example, the processor 100.

<5> Effects Exhibited by System 1000, and Variations of System 1000

The system 1000 has, for example, the configuration shown in FIG. 1.

In the system 1000, the processor 100 and the plurality of sensors 200 are connected together by the data bus B1. Also, in the system 1000, images output by the plurality of sensors 200 are controlled by the processor 100 performing the control involved with an image. Therefore, in the system 1000, the processor 100 can receive images independently output by the plurality of sensors 200 through the data bus B1.

Therefore, in the system 1000, the processor 100 (processing apparatus according to the present embodiment) can be connected to the plurality of sensors 200 (image sensors according to the present embodiment) by a reduced number of data buses.

Also, in the system 1000, the reduction in the number of data buses connected to the processor 100 results in the following effects.

A wiring region where the processor 100 and the plurality of sensors 200 are connected together can be reduced.

The hardware configuration of the processor 100 can be further simplified due to, for example, a reduction in the number of terminals for connecting the data buses.

Also, for example, as shown in FIG. 2A to FIG. 2E, a plurality of images output by sensors 200 are received by the processor 100 as separate images or an image in which two or more images are joined together in the vertical direction or in the horizontal direction. The processor 100 recognizes a plurality of images output by sensors 200 as separate images or an image in which two or more images are joined together in the vertical direction or in the horizontal direction, and performs a predetermined process, such as a process of recording the images into a recording medium (e.g., the memory 300, etc.), a process involved in display of the images on a display device (e.g., the display device 400, etc.), or the like.

Therefore, the system 1000 provides a "mechanism which joins or separates, on the data bus B1, a plurality of images independently output by a plurality of sensors 200."

Note that the configuration of the system according to the present embodiment is not limited to the example shown in FIG. 1.

For example, when images output by a plurality of sensors 200 are stored in a recording medium external to the system, or when images output by a plurality of sensors 200 are stored in a memory included in the processor 100, the system according to the present embodiment may not have the memory 300 shown in FIG. 1.

Also, the system according to the present embodiment can have a configuration which does not have the display device 400 shown in FIG. 1.

Also, the system according to the present embodiment may have any configuration that is suitable for a function possessed by an electronic apparatus (described below) to which the system according to the present embodiment is applied.

Also, the system according to the present embodiment may have a configuration in which M data buses (where M is an integer smaller than the number of the sensors 200) are connected to the processor. Even when the system according to the present embodiment has a configuration in which M data buses (where M is an integer smaller than the number of the sensors 200 included in the system) are connected to the processor, the number of the data buses connected to the processor can be reduced, compared to when an existing standard such as the CSI-2 standard or the like is simply employed.

<6> Application Example of System According to the Present Embodiment

In the foregoing, a system has been described as the present embodiment by way of example. The present embodiment is not limited to this. The present embodiment is applicable to various electronic apparatuses, such as communication apparatuses (e.g., a smartphone, etc.), mobile apparatuses (e.g., a drone (an apparatus which can be remotely operated or autonomously operate), automobile, etc.), computers (e.g., a personal computer (PC), etc.), tablet-type apparatuses, game apparatuses, and the like.

Also, in the foregoing, a processor has been described as a processing apparatus included in the system according to the present embodiment by way of example. The processing apparatus according to the present embodiment is not limited to the above example. For example, the processing apparatus according to the present embodiment is applicable to any processing circuit or device that can perform the control involved with an image which is output by each of a plurality of image sensors connected to a data bus, through the data bus.

(Output Example of Image in System According to the Present Embodiment)

Next, an output example of an image in the system 1000 will be described. In the description that follows, an example will be described in which a signal is transmitted through the data bus B1 in accordance with the CSI-2 standard.

Figure 4:
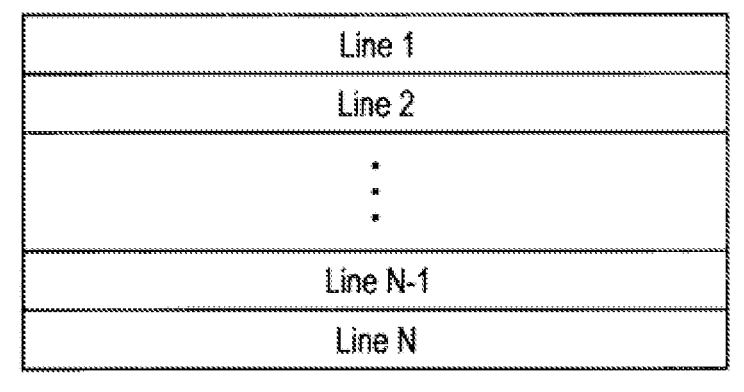

FIG. 4 shows an example of image data generated by the sensor 200 included in the system 1000 according to the present embodiment.

For example, image data generated by the sensor 200 includes N lines of data (where N is an integer of 1 or more), and is output to the data bus B1 on a line-by-line basis.

FIG. 5 shows an example of a packet sequence of image data which is transmitted through the data bus B1 included in the system 1000 according to the present embodiment, in accordance with the CSI-2 standard. In FIG. 5, "FS" indicates an FS packet, and "FE" indicates an FE packet. Also, in FIG. 5, "PH" indicates a packet header, and "PF" indicates a packet footer.

In the CSI-2 standard, after an FS packet P1 is issued at the head of image data, N image data packets P2 are issued, and finally, an FE packet P3 is issued. There is an interval called a line blanking BL1 between one image data packet P1 and another image data packet P1. There is an interval called a frame blanking BL2 between an FE packet P3 and the next FS packet P1.

FIG. 6 and FIG. 7 show packet formats specified in the CSI-2 standard. FIG. 6 indicates the "short packet" format defined in the CSI-2 standard. FIG. 7 indicates the "long packet" format defined in the CSI-2 standard.

The FS packet P1 and the FE packet P3 shown in FIG. 5 are a "short packet." Also, the image data packet P2 shown in FIG. 5 is a "long packet."

In both a "short packet" and a "long packet," a VC number ("VC" shown in FIG. 6 and FIG. 7, a VC value) is recorded in the header thereof. An arbitrary VC number may be provided to each packet. Packets having the same VC number are dealt with as packets contained in the same image data.

As described above, in the system 1000, a VC number may be provided as an identifier to each sensor 200 by the processor 100 performing the control involved with an image.

Also, in both a "short packet" and a "long packet," a DT value ("data type" shown in FIG. 5 and FIG. 6) is recorded in the header thereof. Therefore, as with a VC number, packets having the same DT value can be dealt with as packets contained in the same image data. As described above, in the system 1000, a DT value may be provided as an identifier to each sensor 200 by the processor 100 performing the control involved with an image.

FIG. 8 shows an example of a frame buffer allocated in the memory 300 included in the system 1000 according to the present embodiment.

The processor 100, when receiving the packet sequence shown in FIG. 5, records the received image data into the frame buffer of the memory 300 as shown in FIG. 8.

FIG. 9 is an explanatory diagram showing a packet structure example of image data output from the sensor 200 by the processor 100 included in the system 1000 according to the present embodiment performing the control involved with an image. Part A of FIG. 9 to part D of FIG. 9 each correspond to a packet structure example of image data output from the sensor 200.

Part A of FIG. 9 shows a packet structure example of image data in which both an FS packet P1 and an FE packet P3 are output. Part B of FIG. 9 shows a packet structure example of image data in which an FS packet P1 is output and an FE packet P3 is not output. Part C of FIG. 9 shows a packet structure example of image data in which neither an FS packet P1 nor an FE packet P3 is output. Part D of FIG. 9 shows a packet structure example of image data in which an FE packet P3 is output and an FS packet P1 is not output.

FIG. 10 is a flowchart showing an example of a process involved in the control involved with an image (a process involved in the control method according to the present embodiment) in the processor 100 included in the system 1000 according to the present embodiment. FIG. 10 shows an example of a process involved in the control involved with an image in the processor 100, in a case where the system 1000 includes three image sensors which are referred to as "sensors 200A, 200B, and 200C."

The processor 100 turns on each of the sensors 200A, 200B, and 200C to be controlled, and thereby releases their reset status (S100). The process of step S100 corresponds to an example of a process of initializing the sensors 200A, 200B, and 200C, for example.

The processor 100 configures register settings for the sensor 200A (S102). The processor 100 configures the register settings for the sensor 200A by transmitting control information through the control bus B2.

Here, the processor 100 configures the register settings for the sensor 200A by transmitting control information in which, for example, the sensor 200A is designated, and the address of a register included in the sensor 200A is designated. Alternatively, the processor 100 can configure the register settings for the sensor 200A by transmitting control information in which all sensors 200 to be controlled are designated, and the address of a register included in each sensor 200 is designated, for example. The transmission of the control information in which all sensors 200 to be controlled are designated, and the address of a register included in each sensor 200 is designated, is effective in synchronously recording the same data into the registers included in all of the sensors 200, for example.

The processor 100 configures register settings for the sensor 200B (S104). As in step S102, the processor 100 configures the register settings for the sensor 200B by transmitting control information through the control bus B2.

The processor 100 configures register settings for the sensor 200C (S106). As in step S102, the processor 100 configures the register settings for the sensor 200C by transmitting control information through the control bus B2.

The processor 100 causes each of the sensors 200A, 200B, and 200C to capture an image and output image data to the data bus B1 (S108). The processor 100 transmits control information through the control bus B2 to cause each of the sensors 200A, 200B, and 200C to capture an image and output image data to the data bus B1.

The processor 100 performs, as the process involved in the control involved with an image, a process shown in FIG. 10, for example. Note that, needless to say, examples of the process involved in the control involved with an image are not limited to the example shown in FIG. 10.

For example, by the control involved with an image which is performed by the processor 100 as shown in FIG. 10, control information is recorded into the register included in the sensor 200. Also, the sensor 200 outputs an image on the basis of the control information as described above.

Thus, for example, by the control involved with an image which is performed by the processor 100 as shown in FIG. 10, image data having any of the packet structures shown in part A of FIG. 9 to part D of FIG. 9 is output from the sensor 200.

An output example of an image in the system 1000 will now be described for each of packet sequence examples of image data output from the sensors 200A, 200B, and 200C.

<i> First Example of Output of Image in System 1000

FIG. 11 shows a first example of a packet sequence of image data output by each of the plurality of sensors 200 included in the system 1000 according to the present embodiment.

Part A of FIG. 11 shows an example of a packet sequence of image data output by the sensor 200A. Part B of FIG. 11 shows an example of a packet sequence of image data output by the sensor 200B. Also, part C of FIG. 11 shows an example of a packet sequence of image data output by the sensor 200C. In FIG. 11, an example is shown in which the sensors 200A, 200B, and 200C each output a packet sequence having the structure shown in part A of FIG. 9 (a packet structure of image data in which both an FS packet P1 and an FE packet P3 are output).

In FIG. 11, the output of an image by the sensors 200A, 200B, and 200C is synchronized according to a synchronization signal Vsync.

For example, as shown in part A of FIG. 11, a packet sequence of image data is output by the sensor 200A immediately after reception of a synchronization signal Vsync. Also, as shown in part B of FIG. 11, a packet sequence of image data is output by the sensor 200B after a frame blanking BL2 (corresponding to an output delay amount indicated by control information) set for the sensor 200B has elapsed since reception of the synchronization signal Vsync. Also, as shown in part C of FIG. 11, a packet sequence of image data is output by the sensor 200C after a frame blanking BL2 (corresponding to an output delay amount indicated by control information) set for the sensor 200C has elapsed since reception of the synchronization signal Vsync.

Here, for example, a synchronization signal Vsync is output by the processor 100 through the control bus B2. In the system 1000, a plurality of sensors 200 can be synchronously operated by the processor 100 transmitting a synchronization signal Vsync through the control bus B2. In other words, in the system 1000, the output of an image by a plurality of sensors 200 can be synchronized by the processor 100 performing control through the control bus B2.

Note that the method of synchronously operating a plurality of sensors 200 in the system 1000 is not limited to the above "method in which the processor 100 transmits a synchronization signal Vsync to all sensors 200 included in the system 1000."

For example, in the system 1000, after the processor 100 activates each sensor 200 through the control bus B2, one of the plurality of sensors 200 may function as a master so that the plurality of sensors 200 are synchronized. Specifically, in the system 1000, the sensor 200 functioning as a master transmits a synchronization signal Vsync to the other sensors 200 (sensors 200 functioning as a slave). In the system 1000, the synchronous operation of the plurality of sensors 200 is achieved by the other sensors 200 receiving a synchronization signal Vsync transmitted by the sensor 200 functioning as a master. Here, the transmission and reception of a synchronization signal Vsync between each sensor 200 are performed through, for example, a 1-bit dedicated line between each sensor 200.

As shown in FIG. 11, in the system 1000, a conflict between packet sequences of image data output by the sensors 200A, 200B, and 200C can be avoided by control performed by the processor 100 (or control performed by the sensor 200 functioning as a mater after control performed by the processor 100).

Also, as shown in FIG. 11, packet sequences of image data output by the sensors 200A, 200B, and 200C may be provided with different VC number settings. In FIG. 11, an example is shown in which a VC number "0" is provided to a packet sequence of image data output by the sensor 200A, a VC number "1" is provided to a packet sequence of image data output by the sensor 200B, and a VC number "2" is provided to a packet sequence of image data output by the sensor 200C.

FIG. 12 shows a first example of packet sequences received by the processor 100 included in the system 1000 according to the present embodiment. The packet sequences shown in FIG. 12 correspond to the packet sequences shown in FIG. 11 which are multiplexed on the data bus B1.

The packet sequences shown in FIG. 12 are compliant with the CSI-2 standard. Therefore, the processor 100 can deal with the packet sequences shown in FIG. 12, which correspond to image data output by the plurality of sensors 200, as a packet sequence output by a single sensor 200, as specified in accordance with the CSI-2 standard.

FIG. 13 shows a first example of a packet sequence of image data stored in a frame buffer in the memory 300 included in the system 1000 according to the present embodiment. FIG. 13 shows an example in which the processor 100 stores the packet sequences shown in FIG. 12 into the frame buffer.

For example, the processor 100 allocates a frame buffer in the memory 300 for each VC number, and records the packet sequences shown in FIG. 12 for the respective VC numbers into the frame buffers allocated for the respective VC numbers. In other words, image data output by the sensors 200A, 200B, and 200C, which is indicated by the packet sequences of FIG. 12 multiplexed on the data bus B1, can be separated into portions of the image data for the respective sensors 200 in the respective frame buffers in the memory 300.

<ii> Second Example of Output of Image in System 1000

FIG. 14 shows a second example of a packet sequence of image data output by each of the plurality of sensors 200 included in the system 1000 according to the present embodiment.

Part A of FIG. 14 shows an example of a packet sequence of image data output by the sensor 200A. Part B of FIG. 14 shows an example of a packet sequence of image data output by the sensor 200B. Also, part C of FIG. 14 shows an example of a packet sequence of image data output by the sensor 200C. In FIG. 14, an example is shown in which a packet sequence having the following structure is output by each of the sensors 200A, 200B, and 200C.

Sensor 200A: a packet sequence having the structure shown in part B of FIG. 9 (a packet structure of image data in which an FS packet P1 is output, and an FE packet P3 is not output)

Sensor 200B: a packet sequence having the structure shown in part C of FIG. 9 (a packet structure of image data in which neither an FS packet P1 nor an FE packet P3 is output)

Sensor 200C: a packet sequence having the structure shown in part D of FIG. 9 (a packet structure of image data in which an FE packet P3 is output, and an FS packet P1 is not output)

In FIG. 14, the synchronization and packet output delay of the sensors 200A, 200B, and 200C are similar to those of the first example of output of an image shown in FIG. 11.

Also, as shown in FIG. 14, the packet sequences of image data output by the sensors 200A, 200B, and 200C may be provided with the same VC number setting. In FIG. 14, a VC number "0" is provided to the packet sequence of image data output by each of the sensors 200A, 200B, and 200C.

FIG. 15 shows a second example of packet sequences received by the processor 100 included in the system 1000 according to the present embodiment. The packet sequences shown in FIG. 15 correspond to the packet sequences shown in FIG. 14 which are multiplexed on the data bus B1.

The packet sequences shown in FIG. 15 are compliant with the CSI-2 standard. Therefore, the processor 100 can deal with the packet sequences shown in FIG. 15, which correspond to image data output by the plurality of sensors

200, as a packet sequence output by a single sensor 200, as specified in accordance with the CSI-2 standard.

FIG. 16 shows a second example of a packet sequence of image data stored in a frame buffer in the memory 300 included in the system 1000 according to the present embodiment. FIG. 16 shows an example in which the processor 100 stores the packet sequences shown in FIG. 15 into the frame buffer.

For example, the processor 100 allocates a frame buffer in the memory 300 for each VC number, and records the packet sequences shown in FIG. 15 into the frame buffers allocated for the respective VC numbers. In other words, image data output by the sensors 200A, 200B, and 200C, which is indicated by the packet sequences of FIG. 15 multiplexed on the data bus B1, is stored, as a "single image obtained by joining an image output by the sensor 200A, an image output by the sensor 200B, and an image output by the sensor 200C together in the vertical direction," in the frame buffers in the memory 300.

Therefore, in the second example of output of an image, joining an image output by the sensor 200A, an image output by the sensor 200B, and an image output by the sensor 200C together in the vertical direction, is achieved.

<iii> Third Example of Output of Image in System 1000

FIG. 17 shows a third example of a packet sequence of image data output by each of the plurality of sensors 200 included in the system 1000 according to the present embodiment.

Part A of FIG. 17 shows an example of a packet sequence of image data output by the sensor 200A. Part B of FIG. 17 shows an example of a packet sequence of image data output by the sensor 200B. Also, part C of FIG. 17 shows an example of a packet sequence of image data output by the sensor 200C. In FIG. 17, an example is shown in which a packet sequence having the structure shown in part A of FIG. 9 (a packet structure of image data in which both an FS packet P1 and an FE packet P3 are output) is output each of the sensors 200A, 200B, and 200C.

In FIG. 17, the output of an image by the sensors 200A, 200B, and 200C is synchronized by, for example, control performed by the processor 100 through the control bus B2, as in the first example of output of an image shown in FIG. 11, for example.

For example, as shown in part A of FIG. 17, a packet sequence of image data output by the sensor 200A is output immediately after reception of a synchronization signal Vsync. Also, as shown in part B of FIG. 17, a packet sequence of image data output by the sensor 200B is output after a frame blanking BL2 (corresponding to an output delay amount indicated by control information) set for the sensor 200B has elapsed since reception of the synchronization signal Vsync. Also, as shown in part C of FIG. 17, a packet sequence of image data output by the sensor 200C is output after a line blanking BL1 (corresponding to an output delay amount indicated by control information) set for the sensor 200C has elapsed since reception of the synchronization signal Vsync. Here, the first example shown in FIG. 11 is different from the third example shown in FIG. 17 in that "the output delay of a packet is controlled on a frame-by-frame basis in the first example shown in FIG. 11, while the output delay of a packet is controlled on a line-by-line basis in the third example shown in FIG. 17."

As shown in FIG. 17, in the system 1000, a conflict between packet sequences of image data output by the sensors 200A, 200B, and 200C can be avoided by control performed by the processor 100.

Also, as shown in FIG. 17, packet sequences of image data output by the sensors 200A, 200B, and 200C may be provided with different VC number settings. In FIG. 17, an example is shown in which a VC number "0" is provided to a packet sequence of image data output by the sensor 200A, a VC number "1" is provided to a packet sequence of image data output by the sensor 200B, and a VC number "2" is provided to a packet sequence of image data output by the sensor 200C.

FIG. 18 shows a third example of packet sequences received by the processor 100 included in the system 1000 according to the present embodiment. The packet sequences shown in FIG. 18 correspond to packet sequences shown in FIG. 17 multiplexed on the data bus B1.

The packet sequences shown in FIG. 18 are compliant with the CSI-2 standard. Therefore, the processor 100 can deal with the packet sequences shown in FIG. 18, which correspond to image data output by the plurality of sensors 200, as a packet sequence output by a single sensor 200, as specified in accordance with the CSI-2 standard.

FIG. 19 shows a third example of a packet sequence of image data stored in a frame buffer in the memory 300 included in the system 1000 according to the present embodiment. FIG. 19 shows an example in which the processor 100 stores the packet sequences shown in FIG. 18 into the frame buffer.

For example, the processor 100 allocates a frame buffer in the memory 300 for each VC number, and records the packet sequences shown in FIG. 18 for the respective VC numbers into the frame buffers allocated for the respective VC number. Here, the packet sequences according to the first example shown in FIG. 12, and the packet sequences according to the first example shown in FIG. 18, have different packet orders, but are stored in a frame buffer in the same format. Specifically, image data output by the sensors 200A, 200B, and 200C, which is indicated by the packet sequences of FIG. 18 multiplexed on the data bus B1, can be separated into portions of the image data for the respective sensors 200 in the respective frame buffers in the memory 300.

<iv> Fourth Example of Output of Image in System 1000

FIG. 20 shows a fourth example of a packet sequence of image data output by each of the plurality of sensors 200 included in the system 1000 according to the present embodiment.

Part A of FIG. 20 shows an example of a packet sequence of image data output by the sensor 200A. Part B of FIG. 20 shows an example of a packet sequence of image data output by the sensor 200B. Also, part C of FIG. 20 shows an example of a packet sequence of image data output by the sensor 200C. In FIG. 20, an example is shown in which a packet sequence having the following structure is output by each of the sensors 200A, 200B, and 200C.

Sensor 200A: a packet sequence having the structure shown in part B of FIG. 9 (a packet structure of image data in which an FS packet P1 is output, and an FE packet P3 is not output)

Sensor 200B: a packet sequence having the structure shown in part C of FIG. 9 (a packet structure of image data in which neither an FS packet P1 nor an FE packet P3 is output)

Sensor 200C: a packet sequence having the structure shown in part D of FIG. 9 (a packet structure of image data in which an FE packet P3 is output, and an FS packet P1 is not output)

In FIG. 20, the synchronization and packet output delay of the sensors 200A, 200B, and 200C are similar to those of the third example of output of an image shown in FIG. 17.

Also, as shown in FIG. 20, packet sequences of image data output by the sensors 200A, 200B, and 200C may be provided with the same VC number setting. In FIG. 20, a VC number "0" is provided to a packet sequence of image data output by each of the sensors 200A, 200B, and 200C.

FIG. 21 shows a fourth example of packet sequences received by the processor 100 included in the system 1000 according to the present embodiment. The packet sequences shown in FIG. 21 correspond to the packet sequences shown in FIG. 20 multiplexed on the data bus B1.

The packet sequences shown in FIG. 21 are compliant with the CSI-2 standard. Therefore, the processor 100 can deal with the packet sequences shown in FIG. 21, which correspond to image data output by the plurality of sensors 200, as a packet sequence output by a single sensor 200, as specified in accordance with the CSI-2 standard.

FIG. 22 shows a fourth example of a packet sequence of image data stored in a frame buffer in the memory 300 included in the system 1000 according to the present embodiment. FIG. 22 shows an example in which the processor 100 stores the packet sequence shown in FIG. 21 into the frame buffer.

For example, the processor 100 allocates a frame buffer in the memory 300 for each VC number, and records the packet sequences shown in FIG. 21 into the frame buffers allocated for the respective VC numbers. In other words, image data output by the sensors 200A, 200B, and 200C, which is indicated by the packet sequences shown in FIG. 21 multiplexed on the data bus B1, is stored, as a "single image obtained by joining an image output by the sensor 200A, an image output by the sensor 200B, and an image output by the sensor 200C together in the horizontal direction," in a frame buffers in the memory 300.

Therefore, in the fourth example of output of an image, joining an image output by the sensor 200A, an image output by the sensor 200B, and an image output by the sensor 200C together in the horizontal direction, is achieved.

<v> Other Examples of Output of Image in System 1000

Examples of output of an image in the system 1000 are not limited to the first example described above in <i> to the fourth example described above in <iv>.

For example, in the system 1000, vertically joining images, horizontally joining images, and separating images can be combined by combining two or more of the first example described above in <i> to the fourth example described above in <iv>.

An example will be described. For example, images output by four sensors 200 are referred to as an "image 0," an "image 1," an "image 2," and an "image 3." Combinations of images to be joined can be achieved, such as "the image 0 and the image 1 are joined together in the horizontal direction, the image 2 and the image 3 are joined together in the horizontal direction, and the image 0 and the image 1 joined together in the horizontal direction and the image 2 and the image 3 joined together in the horizontal direction are joined together in the vertical direction" and the like.

(Program According to the Present Embodiment)

A system having a "mechanism which joins or separates, on a data bus, a plurality of images independently output by a plurality of sensors" can be provided by a program for causing a computer to function as the processing apparatus according to the present embodiment (e.g., a program which causes a computer to execute a process involved in control involved with an image (a process involved in the control method according to the present embodiment)) being executed by a processor or the like in the computer.

Also, effects exhibited by the above process involved in control involved with an image (the process involved in the control method according to the present embodiment) can be exhibited by a program for causing a computer to function as the processing apparatus according to the present embodiment being executed by a processor or the like in the computer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the foregoing has indicated that a program (computer program) for causing a computer to function as the processing apparatus according to the present embodiment is provided. Furthermore, in the present embodiment, a recording medium storing the above program can be additionally provided.

The above configuration is an example of the present embodiment, and of course, is within the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A processing apparatus including:

a processing unit that is connected to a data bus, and performs control involved with an image which is output by each of a plurality of image sensors connected to the data bus, through the data bus.

(2)

The processing apparatus according to (1), wherein the processing unit performs, as the control involved with an image, control of joining of the respective images output by the plurality of image sensors.

(3)

The processing apparatus according to (2), wherein the processing unit controls start of a frame and end of the frame in the images output by the plurality of image sensors to control the joining of the images.

(4)

The processing apparatus according to (3), wherein the processing unit controls the start of the frame by controlling output of a frame start packet in each of the plurality of image sensors.

(5)

The processing apparatus according to (3) or (4), wherein the processing unit controls the end of the frame by controlling output of a frame end packet in each of the plurality of image sensors.

(6)

The processing apparatus according to any one of (3) to (5), wherein the processing unit further controls addition of an identifier to each of the respective images output by the plurality of image sensors to control the joining of the images.

(7)

The processing apparatus according to any one of (1) to (6), wherein the processing unit performs, as the control involved with an image, one or both of control of a size of the image output by each of the plurality of image sensors, and control of a frame rate of the image output by each of the plurality of image sensors.

(8)

The processing apparatus according to any one of (1) to (7), wherein the processing unit performs, as the control involved with an image, control of an output timing of the image output by each of the plurality of image sensors.

(9)

The processing apparatus according to any one of (1) to (8), wherein the processing unit performs the control involved with an image by transmitting control information to each of the plurality of image sensors.

(10)

The processing apparatus according to (9), wherein the control information is transmitted through a control bus different from the data bus, the control bus being connected to each of the plurality of image sensor.

(11)

The processing apparatus according to (9) or (10), wherein the control information is recorded in a register included in the image sensor.

(12)

An image sensor that is connected to a data bus to which another image sensor is connected, and outputs an image on the basis of control information.

(13)

The image sensor according to (12), wherein the control information contains first output information indicating whether or not a frame start packet is to be output, and in a case where the first output information indicates that the frame start packet is to be output, the image sensor outputs the frame start packet together with the image.

(14)

The image sensor according to (12) or (13), wherein the control information contains second output information indicating whether or not a frame end packet is to be output, and in a case where the second output information indicates that the frame end packet is to be output, the image sensor outputs the frame end packet together with the image.

(15)

The image sensor according to any one of (12) to (14), wherein the control information contains third output information indicating an identifier of the image, and the image sensor outputs the identifier indicated by the third output information together with the image.

(16)

The image sensor according to any one of (12) to (15), wherein the control information is stored in a register.

(17)

A system including:

a plurality of image sensors each of which is connected to a data bus; and a processing apparatus that is connected to the data bus, wherein the processing apparatus includes a processing unit that performs control involved with an image which is output by each of the image sensors through the data bus.

REFERENCE SIGNS LIST 100, 250 processor
102 processing unit
200, 200A, 200B, 200C sensor
252 ROM
254 register
256 sensor device
258 communication device
260 internal bus
270 identification information
272 control information
300 memory
400 display device
1000 system
B1 data bus
B2 control bus

The invention claimed is:

1. A processing apparatus comprising:
a processing circuitry configured to
    connect to a plurality of image sensors via a data bus,
    update register settings to provide control information respectively corresponding to each of the image sensors, the control information including a frame start packet indication and a frame end packet indication, and
    prompt the image sensors to capture images and output image data corresponding to the images to the data bus.

2. The processing apparatus according to claim 1, wherein the frame start packet indication indicates, to a corresponding one of the image sensors, whether to insert a frame start packet for the output image data.

3. The processing apparatus according to claim 2, wherein the frame end packet indication indicates, to a corresponding one of the image sensors, whether to insert a frame end packet for the output image data.

4. The processing apparatus according to claim 3, wherein the processing circuitry is configured to
    receive the output image data corresponding to the images via the data bus, and
    control a joining of the images using a frame start packet inserted before a first image of the images and a frame end packet inserted after a last image of the images.

5. The processing apparatus according to claim 4, wherein the frame start packet is a single frame start packet for all of the images that is inserted before only the first image.

6. The processing apparatus according to claim 4, wherein the frame end packet is a single frame end packet for all of the images that is inserted after the last image.

7. The processing apparatus according to claim 1, wherein the control information includes an image size constraint.

8. The processing apparatus according to claim 1, wherein the control information includes an image output timing information.

9. A processing apparatus comprising:
a processor; and
a memory, the memory storing program code executable by the processor to perform operations comprising:
    connecting to a plurality of image sensors via a data bus,
    updating register settings to provide control information respectively corresponding to each of the image sensors, the control information including a frame start packet indication and a frame end packet indication, and prompting the image sensors to capture images and output image data corresponding to the images to the data bus.

10. The processing apparatus according to claim 9, wherein the frame start packet indication indicates, to a corresponding one of the image sensors, whether to insert a frame start packet for the output image data.

11. The processing apparatus according to claim 10, wherein the frame end packet indication indicates, to a corresponding one of the image sensors, whether to insert a frame end packet for the output image data.

12. The processing apparatus according to claim 11, wherein the operations further comprise:

receiving the output image data corresponding to the images via the data bus, and controlling a joining of the images using a frame start packet inserted before a first image of the images and a frame end packet inserted after a last image of the images.

13. The processing apparatus according to claim 12, wherein the frame start packet is a single frame start packet for all of the images that is inserted before only the first image.

14. The processing apparatus according to claim 12, wherein the frame end packet is a single frame end packet for all of the images that is inserted after the last image.

15. The processing apparatus according to claim 9, wherein the control information includes an image size constraint.

16. The processing apparatus according to claim 9, wherein the control information includes an image output timing information.

17. An image processing method comprising:

connecting to a plurality of image sensors via a data bus, updating register settings to provide control information respectively corresponding to each of the image sensors, the control information including a frame start packet indication and a frame end packet indication, and prompting the image sensors to capture images and output image data corresponding to the images to the data bus.

* * * * *